United States Patent [19]

Shafir

[11] Patent Number: 5,005,318

[45] Date of Patent: Apr. 9, 1991

[54] METHOD AND APPARATUS FOR CUTTING GLASS BLANKS

[75] Inventor: Aaron Shafir, Tel Aviv, Israel

[73] Assignee: O/Y Kyro A/B, Tamglass Corp., Tampere, Finland

[21] Appl. No.: 213,406

[22] Filed: Jun. 30, 1988

[51] Int. Cl.⁵ .............................................. C03B 33/02
[52] U.S. Cl. .................... 51/5 C; 51/283 R; 51/101 R; 83/881; 83/886; 83/887; 65/174; 65/112
[58] Field of Search ................ 51/283 R, 283 E, 321, 51/410, 5 C, 326, 327, 101 R; 65/174, 112; 83/881, 886, 887

[56] References Cited

U.S. PATENT DOCUMENTS

| | | | |
|---|---|---|---|
| 3,474,944 | 10/1969 | Chatelain et al. | 65/174 |
| 4,577,539 | 3/1986 | Bonacci | 83/886 |
| 4,698,088 | 10/1987 | Bando | 65/174 |
| 4,744,176 | 5/1988 | Sack et al. | 51/101 R |

FOREIGN PATENT DOCUMENTS

| | | | |
|---|---|---|---|
| 0011238 | 5/1980 | European Pat. Off. | 65/174 |
| 8003745 | 8/1981 | France | 51/283 R |

Primary Examiner—Robert A. Rose
Attorney, Agent, or Firm—Benjamin J. Barish

[57] ABSTRACT

Apparatus for cutting glass blanks according to a particular contour, comprises a scoring maching for scoring the contour on the glass blank, a breaking machine for severing the scored contour from the glass blank, and a grinding machine for smoothing the edges of the severed blank. A conveyor conveys the glass blank to each of the above machines for performing their respective operations, and a computerized control system controls the three machines according to digital files prepared for each machine.

13 Claims, 21 Drawing Sheets

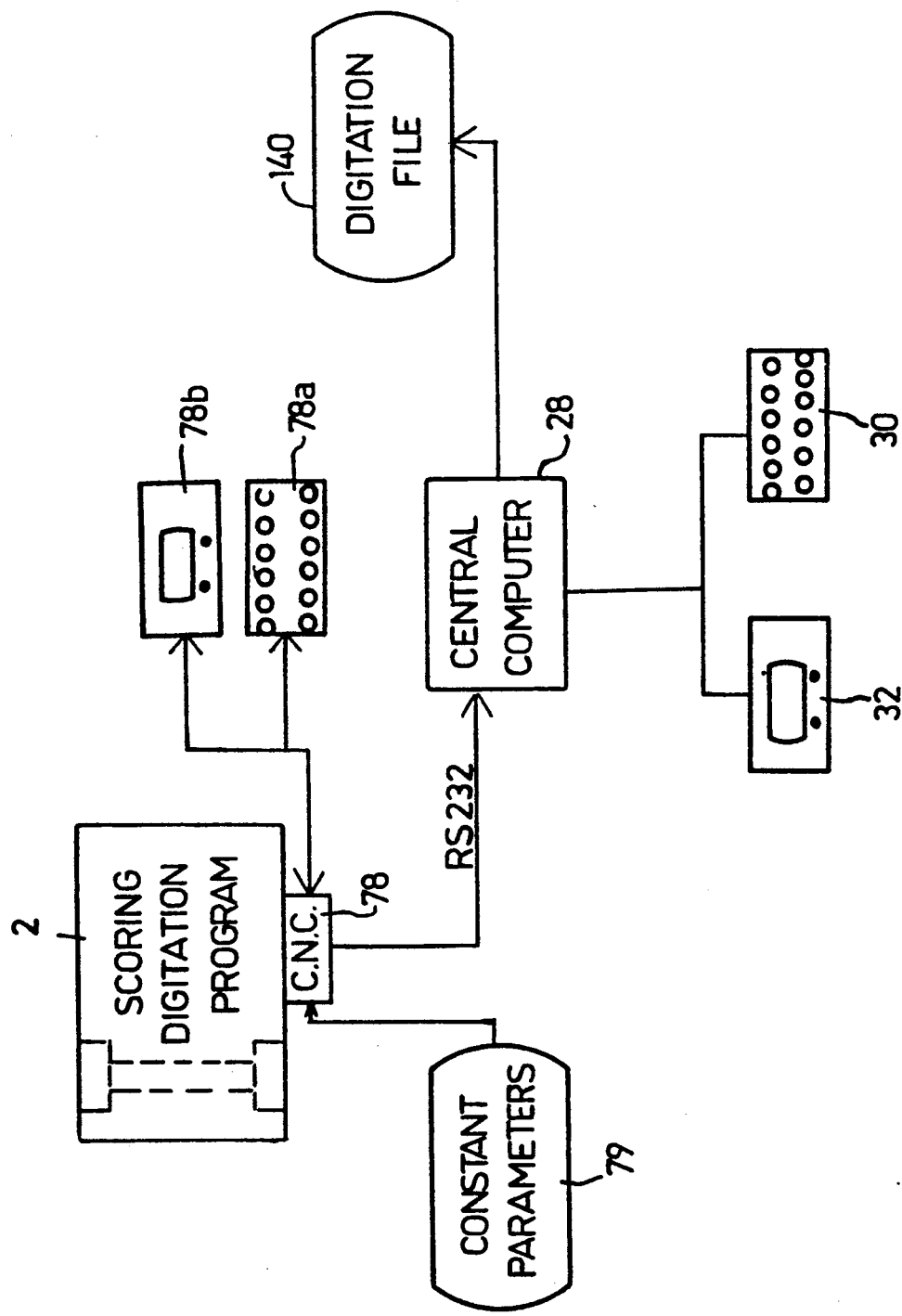

(CENTRAL COMPUTER)

METHOD AND APPARATUS FOR CUTTING GLASS BLANKS

BACKGROUND OF THE INVENTION

The present invention relates to a method and apparatus for cutting a glass blank according to a particular contour. The invention is particularly useful for cutting glass blanks in making windshields for motor vehicles, and is therefore described below with respect to this application.

The manufacture of windshields for motor vehicles involves first scoring the contour of the windshield on a glass blank, severing the scored contour from the glass blank, and grinding the edges of the severed blank. The glass blank is then bent into the required shape and is subjected to a thermal treatment. When a laminated windshield is produced, two such glass blanks are joined together with a transparent adhesive.

At the present time, the scoring, severing and grinding operations are usually performed manually with the aid of patterns traced by a tracing wheel. Recently, computerized numerical control (CNC) scoring machines have been developed for controlling the scoring operation by digital data manually prepared by the use of a digitizer table. However, even with the use of such CNC scoring machines, the grinding is still performed by the use of a tracing wheel.

An object of the present invention is to provide a novel method and apparatus for automatically cutting a glass blank according to a particular contour, which method and apparatus are particularly useful in making windshields for automotive vehicles. Other objects of the invention are to provide a novel scoring machine, a novel breaking machine, and a novel grinding machine, all computer-controlled, for use in cutting glass blanks.

BRIEF SUMMARY OF THE INVENTION

According to one aspect of the present invention, there is provided a method of cutting a glass blank according to a particular contour, comprising: digitizing the contour to prepare a digital contour file; utilizing the digital contour file to prepare a digital scoring file, a digital breaking file, and a digital grinding file; conveying a glass blank to a scoring machine, then to a breaking machine, and then to grinding machine; and utilizing the digital scoring file for controlling the scoring machine to score the desired digitized contour on the glass blank, the digital breaking file for controlling the breaking machine to sever the scored contour from the glass blank, and the digital grinding file for controlling the grinding machine to smoothen the edges of the severed glass blank.

According to another aspect of the present invention, there is provided apparatus for cutting glass blanks according to a particular contour, comprising: a scoring machine including a separate drive therefor for scoring the contour on the glass blank; a breaking machine for severing the scored contour from the glass blank; a grinding machine including a separate drive therefor for smoothing the edges of the severed blank; a conveyor for conveying the glass blank to each of the above machines for performing their respective scoring, severing and grinding operations thereon; and a control system for controlling the scoring machine including its separate drive according to a digital scoring file, for controlling the breaking machine according to a digital breaking file, and for controlling the grinding machine including its separate drive according to a digital grinding file.

Preferably, the control system includes a separate computer for each of the above three machines and attached thereto.

According to a further aspect of the invention, there is provided a scoring machine comprising a table for supporting a glass blank; a first carriage movable along a first axis with respect to the table; a second carriage movable along a second axis with respect to the table perpendicular to the first axis; a scoring head mounted to the second carriage; and an edge sensor, for sensing the contour of a model or drawing of the glass blank to be cut, also mounted on the second carriage.

According to a still further aspect of the invention, there is provided a breaking machine particularly useful in apparatus for cutting glass blanks according to a particular contour, comprising: a plurality of heating devices; positioning means for positioning each of the heating devices with respect to a glass blank on the table; programmed control means for controlling the positioning means to position each of the heating devices in alignment with the point of the smallest radius of curvature in each corner of a scored glass blank on the table, which glass blank has been scored, according to the contour to be cut; and means for energizing the heating devices, when properly positioned with respect to the scored glass blank, to apply a thermal shock to the glass blank such as to sever the scored contour from the glass blank.

According to a still further aspect of the invention, there is provided a grinding machine particularly useful with a cutting machine for cutting glass blanks according to a particular contour, comprising: a table for supporting the glass blank after conveyed thereto by a conveyor; a drive for rotating the table around a first axis; a grinding head; a drive for moving the grinding head along a second axis perpendicular to the first axis towards and away from the glass blank on the table; and programmed control means for controlling the latter drive to cause it to smoothen the outer edges of the glass blank on the table.

The invention is thus particularly useful in the manufacture of glass blanks which may be subsequently processed by the bending, thermal-treatment and lamination operations in the production of windshields for motor vehicles. The invention permits the glass blanks to be produced in a fully-automated production line having a high throughput and a short set-up time. This short set-up time (e.g., in the order of 5–15 minutes in a typical system), permits the apparatus to be efficiently used to produce the glass blanks in small batches as well as in large batches. The invention also permits automatic digitation of new models, and maximum utilization of raw materials.

The invention is particularly useful when embodied in a complete production line including all of the above-described machines, each individually computer-controlled. However, the invention also permits a modular construction, in which the individual machines can be efficiently used as separate modular units with other units in the production line.

Further features and advantages of the invention will be apparent from the description below.

BRIEF DESCRIPTION OF THE DRAWINGS

The invention is herein described, by way of example only, with reference to the accompanying drawings, wherein:

FIG. 14 is a flow diagram illustrating the operation of the central computer in the Digitation (or Study) Mode of operation of FIG. 12a;

DESCRIPTION OF A PREFERRED EMBODIMENT Overall Apparatus

Figure 1:
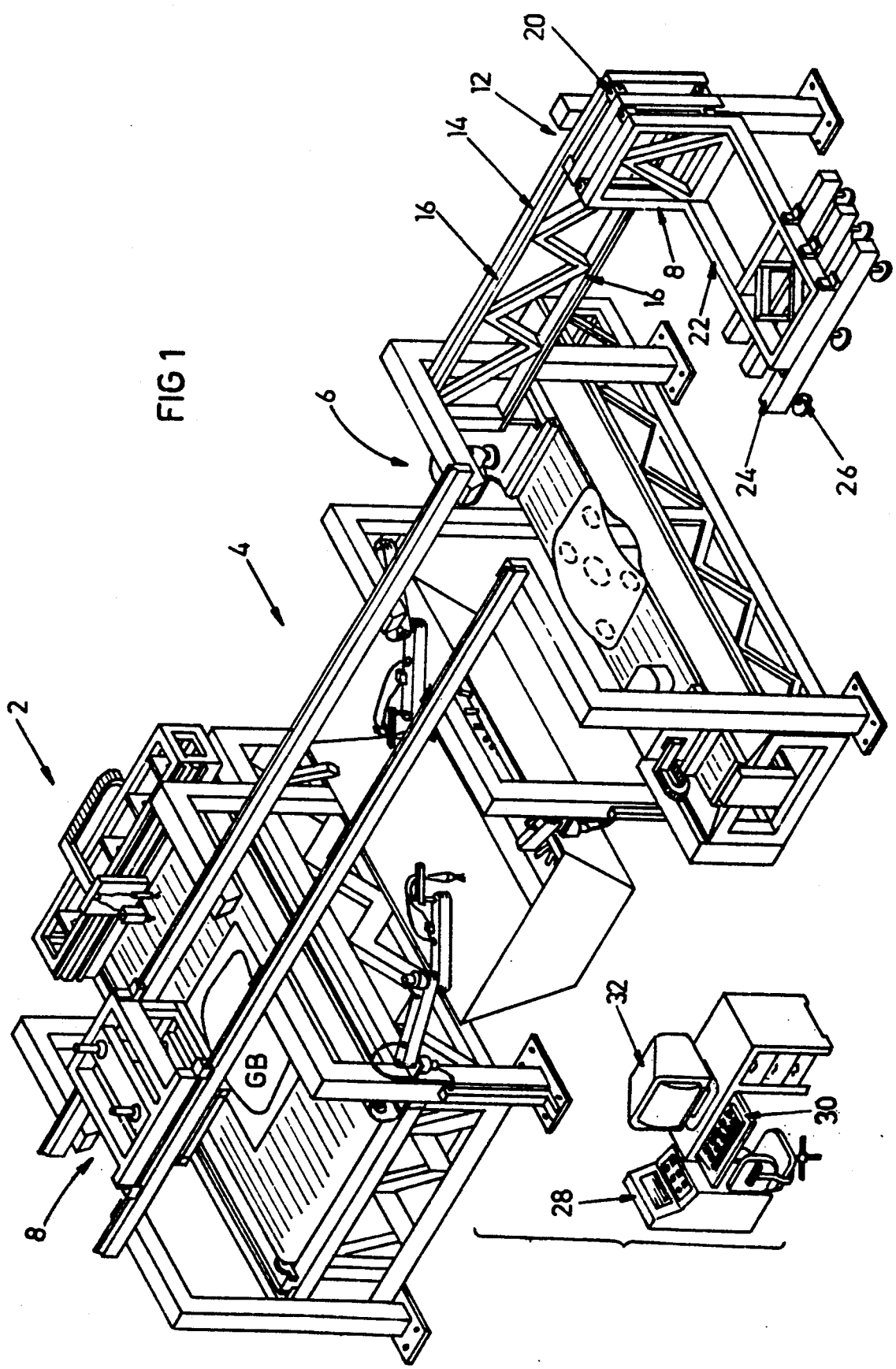
FIG. 1 is a three-dimensional view illustrating one form of apparatus constructed in accordance with the invention for cutting a glass blank according to a particular contour.

The apparatus illustrated in FIG. 1 of the drawings is designed particularly for cutting glass blanks GB according to a particular contour to be used in the manufacture of windshields for automotive vehicles. The appartus comprises a scoring machine, generally designated 2, for scoring the contour on the glass blank GB according to a previously-digitized model, or for digitizing a new model; a breaking machine, generally designated 4, for severing the scored contour from the glass blank GB; and a grinding machine, generally designated 6, for smoothening the edges of the severed blank.

The illustrated apparatus further comprises an overhead crane, generally designated 8, for conveying the glass blanks GB from one machine to the next; a loading sub-system (not shown), at the input end of the line for loading the glass blanks from a stack, or from two different stacks, onto a conveyor conveying the glass blanks into the scoring machine 10; and a side crane, generally designated 12, at the output end of the line.

Side crane 12 is supported on a frame extension 14 of the overhead crane 8 carrying a pair of rails 16. The side crane 12 includes a vertical frame structure 18 formed with slides 20 movable along rail 16, and a horizontal frame structure 22 carrying a manipulator 24 having vacuum handlers 26 for conveying the glass blanks from the grinding machine 6 to the following stations of the production line (not shown), which perform the bending, heat-treatment and laminating operations to produce the finished windshields.

The invention of the present application is particularly directed to the construction and operation of the scoring machine 2, the breaking machine 4, and the grinding machine 6, as well as of the overhead crane 8 which conveys the glass blanks from one machine to the next. The remainder of the description will therefore be directed to these aspects of the apparatus of FIG. 1 as more particularly illustrated in the remaining figures of the drawings.

The overall operation of the machine is controlled by a central computer 28 including a keyboard input 30 and a display 32. The scoring machine 2, the breaking machine 4, and the grinding machine 6 are each provided with its own CNC (computerized numerical control) computer (not shown in FIG. 1) controlling the operation of the respective machine, all under the control the central computer 28. In addition, each of these machines, as well as the overhead crane 8, is provided with a PLC (programmable logic controller), as will be described more particularly below.

Figure 2:
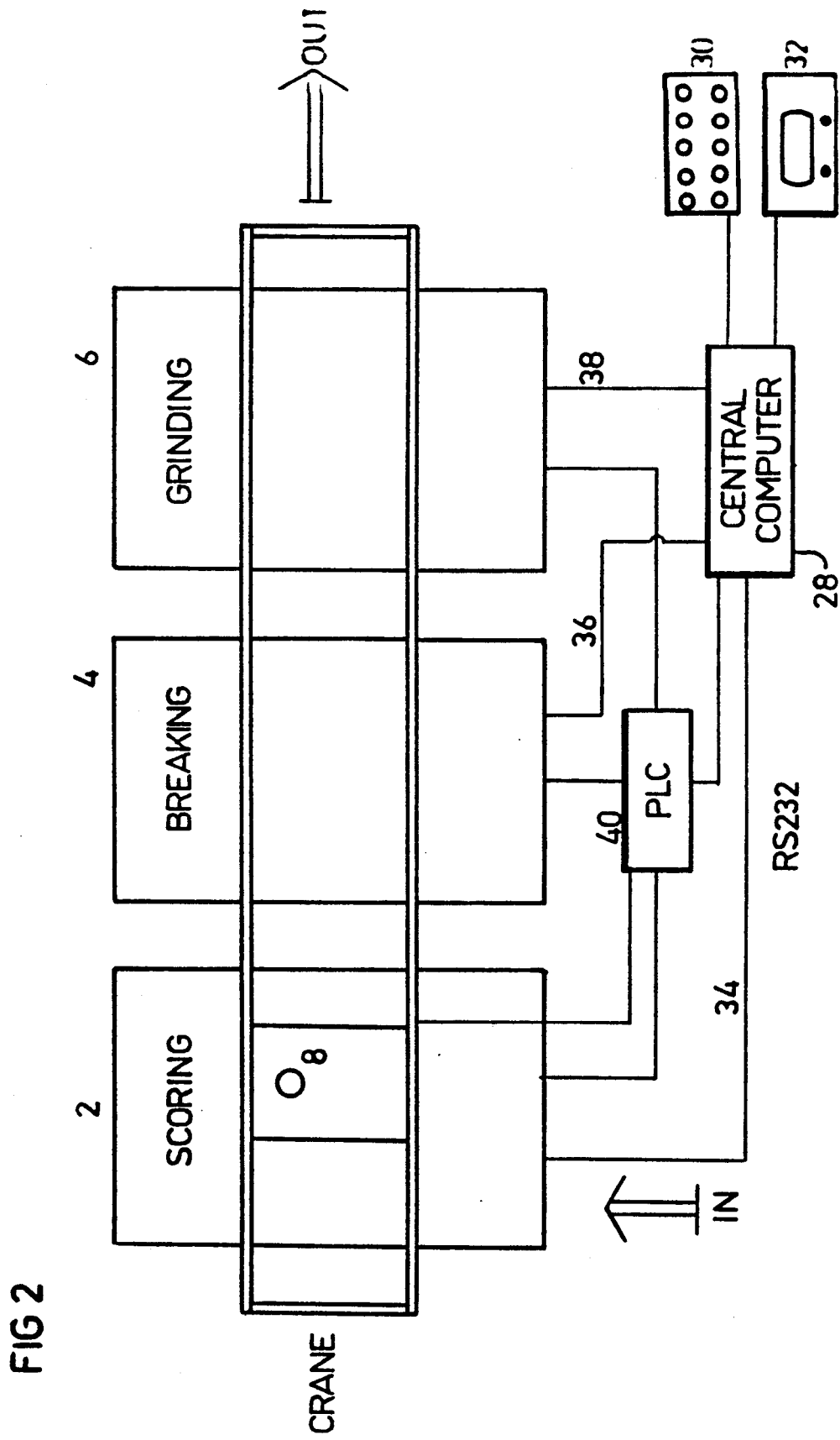
FIG. 2 diagrammatically illustrates the overall control of the apparatus of FIG. 1.

FIG. 2 schematically illustrates the overall control of the scoring machine 2, breaking machine 4 and grinding machine 6 by the central computer 28. As shown in FIG. 2, each of the above machines is connected to the central computer via a communication link in the form of a conventional RS 232 bus 34, 36, 38, respectively.

The overhead crane 18 includes a PLC unit 40 which is controlled by the central computer 28 and which in turn controls the crane to convey the glass blanks to their proper positions in the scoring machine 2, breaking machine 4, and grinding machine 6 to enable the latter machines to perform their respective operations on the glass blanks. The PLC unit 40 is also connected to the CNC computers of the scoring, breaking and grinding machines 2, 4, 6, so as to synchronize their operations.

The Overhead Crane 8

Figure 3:
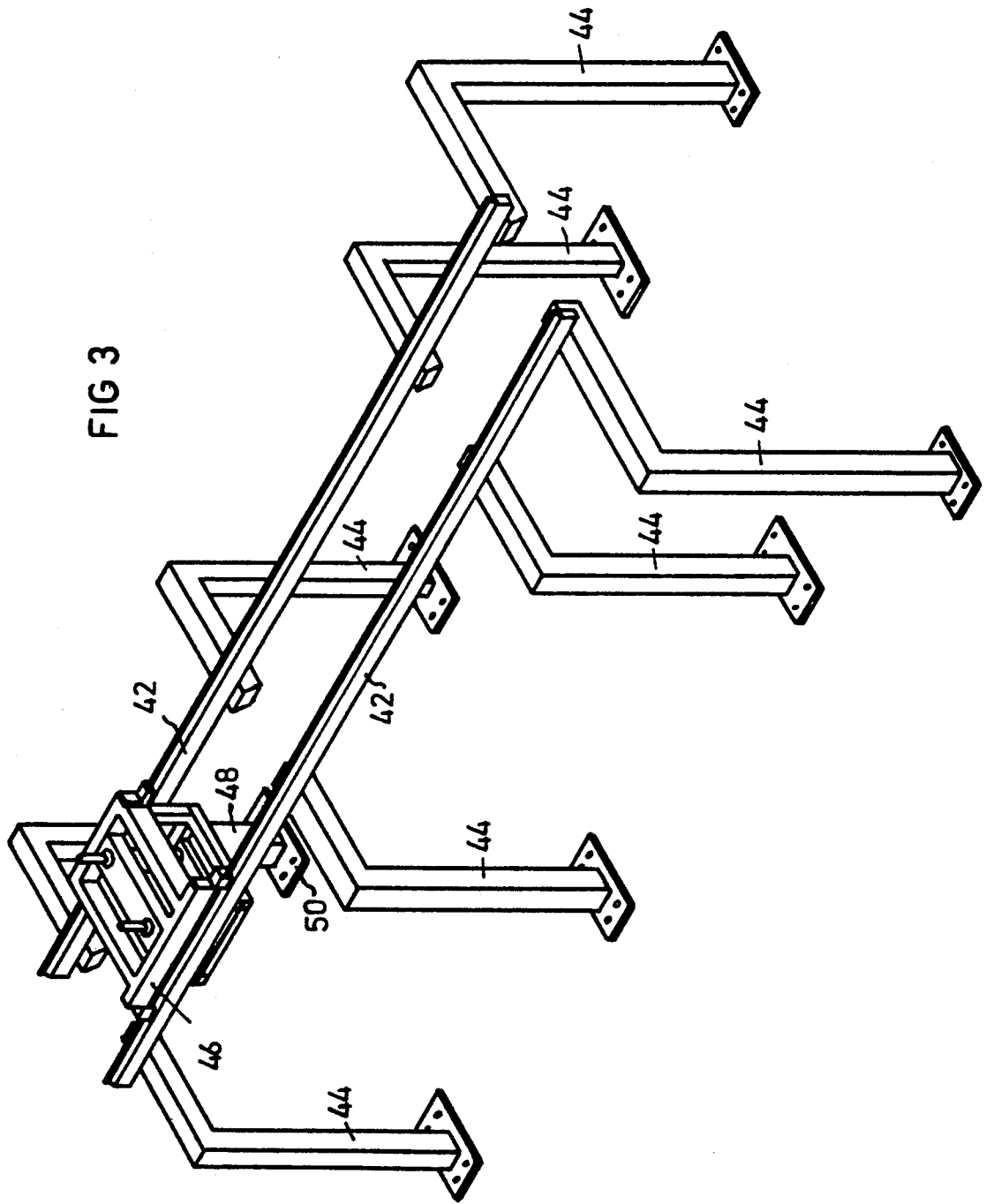
FIG. 3 illustrates the overhead crane in the apparatus of FIG. 1 for conveying the workpieces from one machine to the next.

The overhead crane, as particularly illustrated in FIGS. 1 and 3, comprises a pair of rails 42, supported by a plurality of vertical posts 44 to extend over the scoring machine 2, breaking machine 4 and grinding machine 6 arranged in a straight line. Crane 8 includes a slide 46 movable along rails 42, and a bridge 48 carrying a vacuum-type manipulator 50 equipped with a plurality of suction cups 52 (FIG. 4) for conveying the plate glass from one machine to the other. Bridge 48 is movable transversely of slide 46, and manipulator 50 is movable vertically with respect to the slide.

Figure 4:
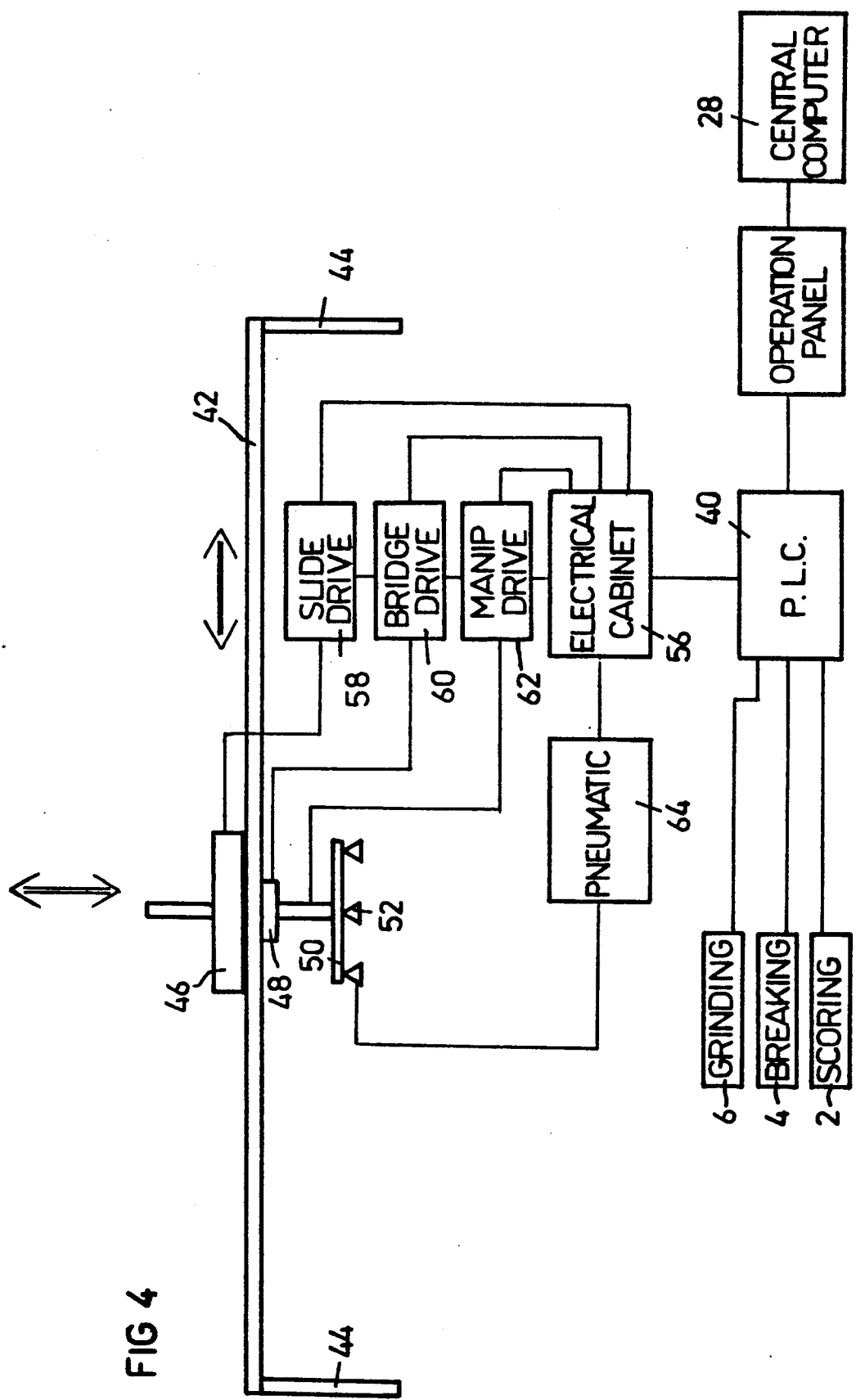
FIG. 4 diagrammatically illustrates the control of the overhead crane of FIG. 3.

FIG. 4 diagrammatically illustrates the overall control of the overhead crane 8. Its PLC unit 40 is connected to the central computer 28 (FIG. 2) via an operation panel 54 which enables manual or automatic operation of the crane. As indicated earlier, PLC unit 40 of the overhead crane 18 is also connected to the computers of the scoring machine 2, the breaking machine 4, and the grinding machine 6, in order to synchronize their operations with that of the crane.

The PLC unit 40 of the overhead crane includes a connection via an electrical cabinet 56 to the drive 58 for the slide 46 to control its position longitudinally along tracks 42, a connection to the drive 60 for the bridge 48 to control its position tranversely of the slide, and a connection to the drive 62 for the manipulator 50 in order to control its vertical position with respect to the slide and bridge. PLC unit 40 is also connected via electrical cabinet 56 to the pneumatic control system 64 for controlling the suction applied to the suction cups 52 of manipulator 50.

The drive systems 58, 60, 62 for the slide 46, bridge 48 and manipulator 50, respectively, and the pneumatic system 64, all controlled by the central processor 28 via the PLC unit 40, may be of known types for controlling the operation of the crane to transfer the glass blank GB successively to the scoring machine 2, breaking machine 4 and grinding machine 6, to permit these machines to perform their respective operations on the glass blank before the glass blank exits from the line via the side crane 12.

The Scoring Machine 2

Figure 5:
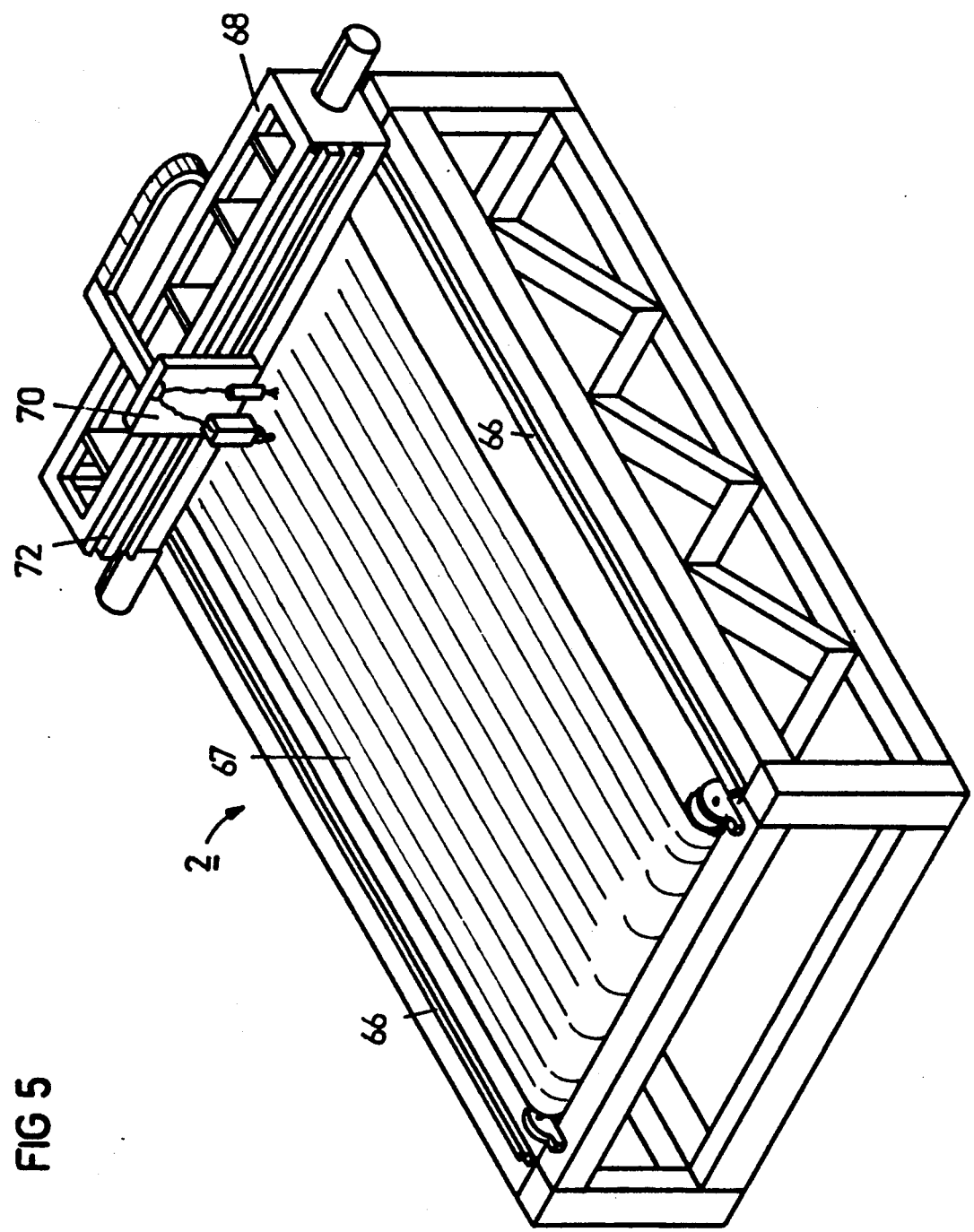
FIG. 5 is a three-dimensional view more particularly illustrating the scoring machine in the appratus of FIG. 1 for scoring the glass blank according to the particular contour, and also for digitizing the contour of a new model.
Figure 6:
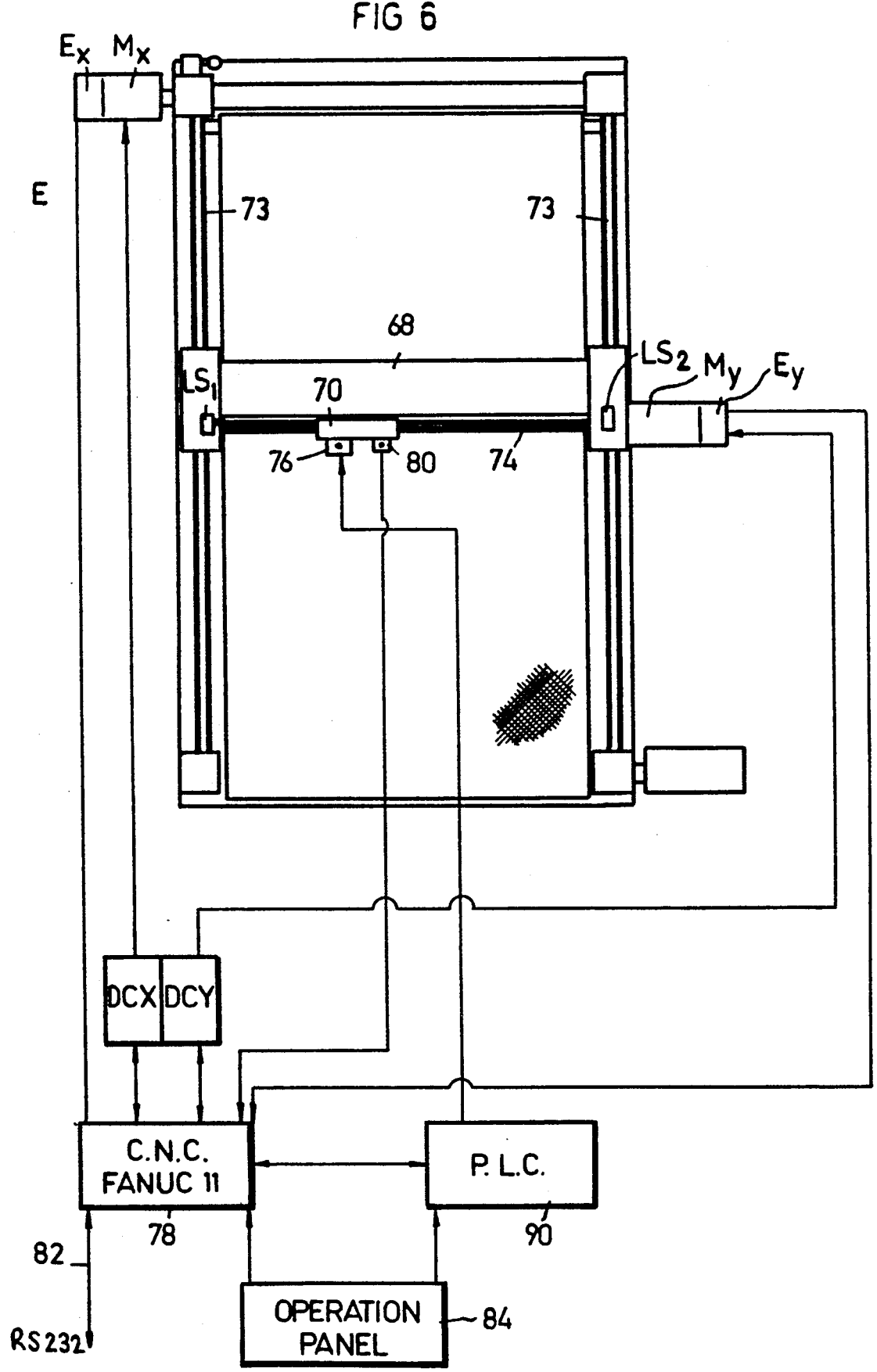
FIG. 6 diagrammatically illustrates the control of the scoring machine of FIG. 5.

FIG. 5 more particularly illustrates the construction of the scoring machine 2, and FIG. 6 diagrammatically illustrates the control system for that machine.

As shown in FIG. 5, the scoring machine 2 includes a pair of rails 66, straddling the conveyor belt 67 receiving the glass blank from the loading subsystem (FIG. 1). A first carriage 68 is movable along the X-axis on rails 66; and a second carriage 70, slidable on tracks 72 of carriage 68, is movable along the Y-axis.

As shown in FIG. 6, carriage 68 is driven along the X-axis (along rail 66) by drive motor $M_X$ driving a pair of ball screws 73 passing through nuts at the opposite ends of the carriage; and carriage 70 is driven along the Y-axis (transversely of carriage 68) by a drive motor $M_Y$ and a ball screw 74 carried by carriage 68 and passing through a nut on carriage 70. Each of these drives further includes an encoder $E_X$ and $E_Y$, respectively, encoding the position of the respective carriage. Carriage 68 further includes two limit switch $LS_1$, $LS_2$ determining the limit positions of carriage 70 on carriage 68.

Carriage 70 carries a scoring head 76, such as a diamond wheel, effective to score the contour of the glass blanks to be produced during the normal manufacturing, or Process Mode of operation, of the apparatus under the control of a CNC computer 78 included in the scoring machine 2. Carriage 70 also carries a sensor 80 which is use for digitizing a new contour, e.g., from a model or drawing, during the Digitation (or Study) mode of operation of the apparatus when a new windshield shape is to be introduced into the apparatus.

The position of carriage 70, and thereby the positions of the scoring head 76 and sensor 80, are controlled by CNC computer 78 via drive control circuitry $DC_X$ connected to motor $M_X$, and drive control circuitry $DC_Y$ connected to motor $M_Y$. The CNC computer 78 also receives the positional data of carriage 70 from the encoders $E_X$, $E_Y$, which produce feedback data to the computer as to the actual position of carriage 70, and thereby of the scoring head 76 and sensor 80.

The CNC computer 78 further includes a first port for connection to an external communication link 82, e.g., an RS 232 bus, in order to input various programs and/or controls; a second port for connection to an operation panel 84 to receive man-machine interface (MMI) information, (e.g., as inputted via a keyboard, joystick, or display); and a third port connected to a PLC (programmable logic controller) unit 90, which permits control by the overhead crane 8 of the movements of the two carriages 68, 70, as well as other operations in the machine.

The Breaking Machine 4

The breaking or severing of the glass blank GB along the lines scored by the scoring machine 2 is effected by thermal shocks applied by heating devices, namely, gas burners, precisely positioned with respect to the four corners of the scored glass blank GB. The breaking machine 4 in the apparatus of FIG. 1 for performing this operation is more particularly illustrated in FIGS. 7–9.

Figure 7:
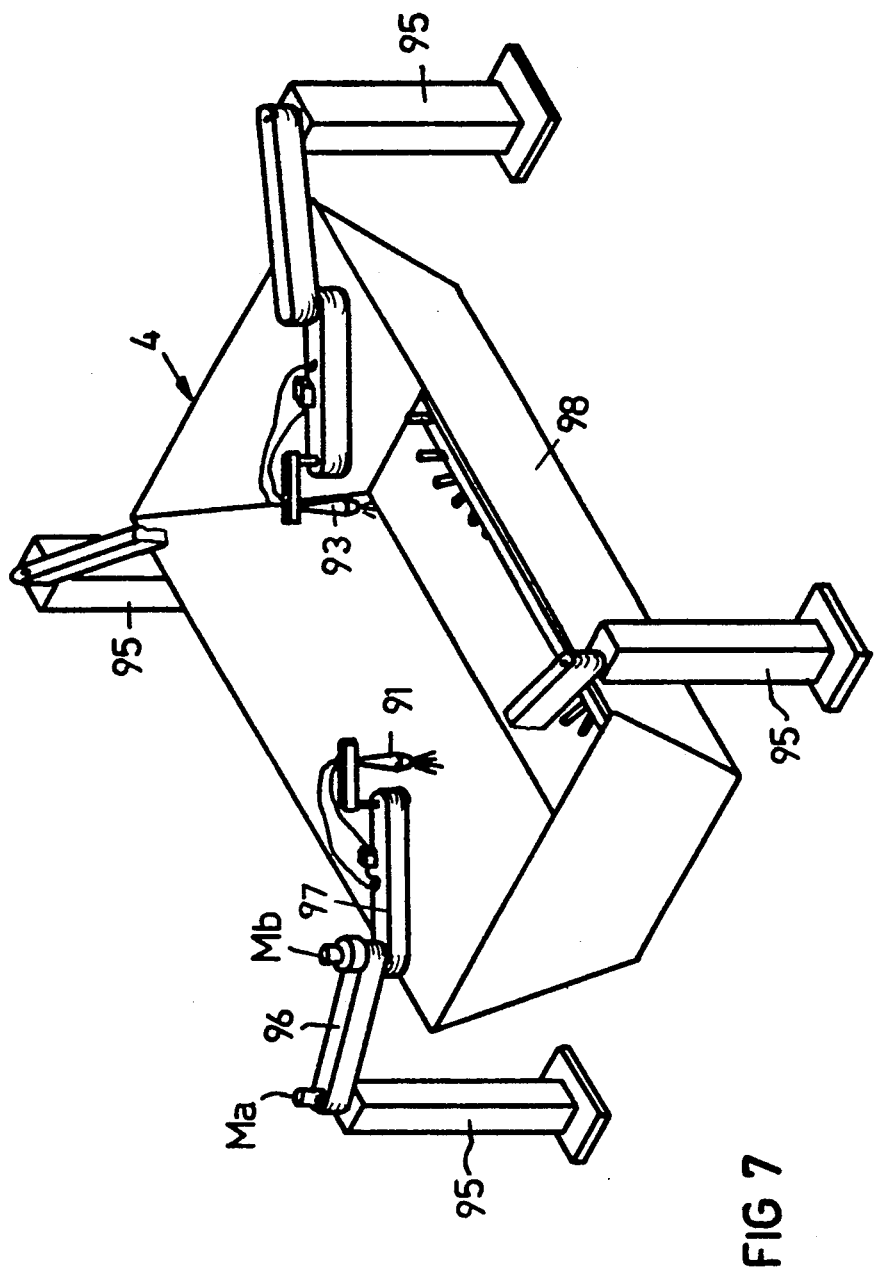
FIG. 7 illustrates the structure of the breaking machine in the apparatus of FIG. 1 for severing the scored contour from the glass blank.
Figure 8:
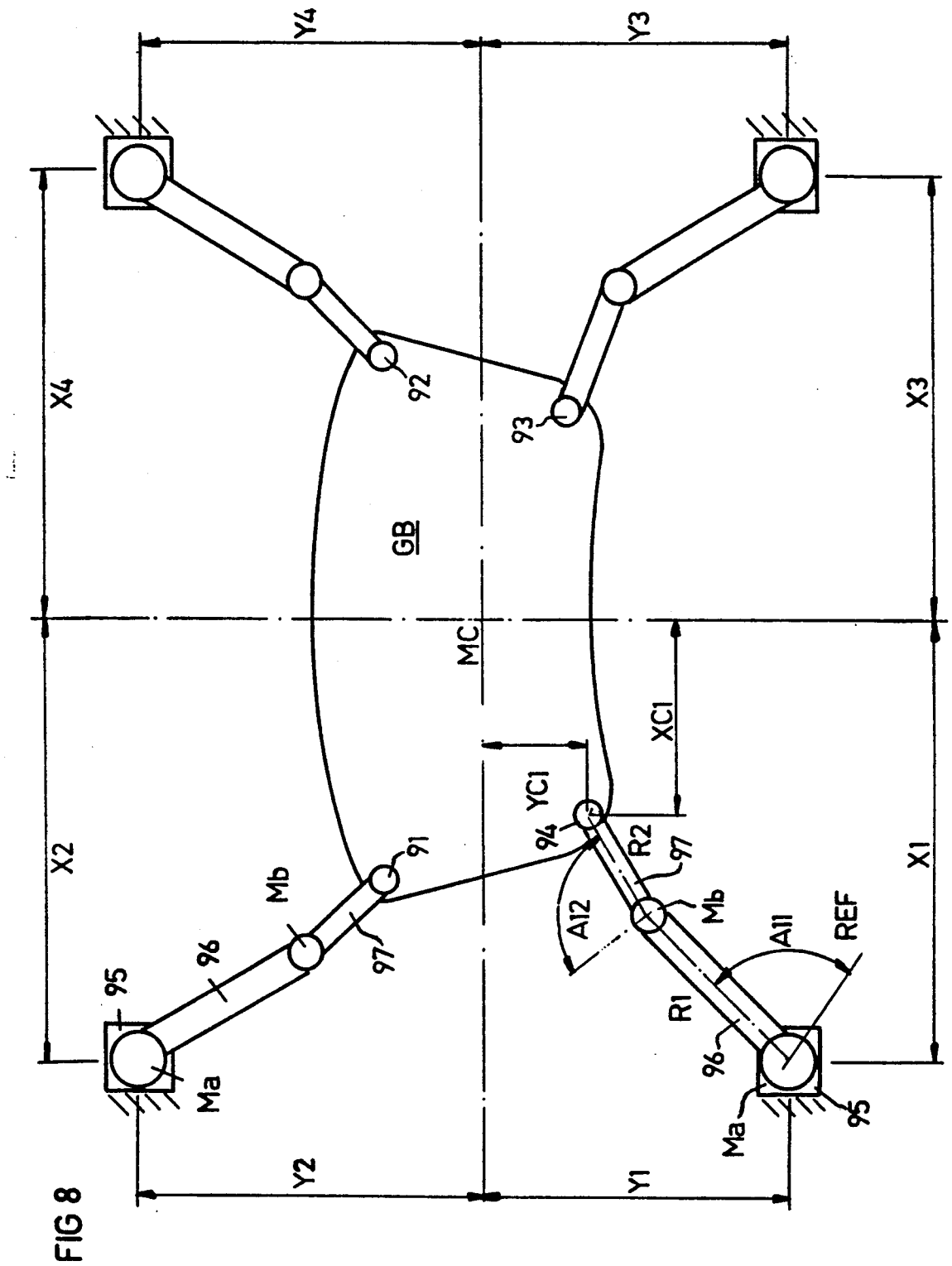
FIG. 8 more particularly illustrates the manner of controlling the positions of the burners in the breaking machine of FIG. 7.
Figure 9:
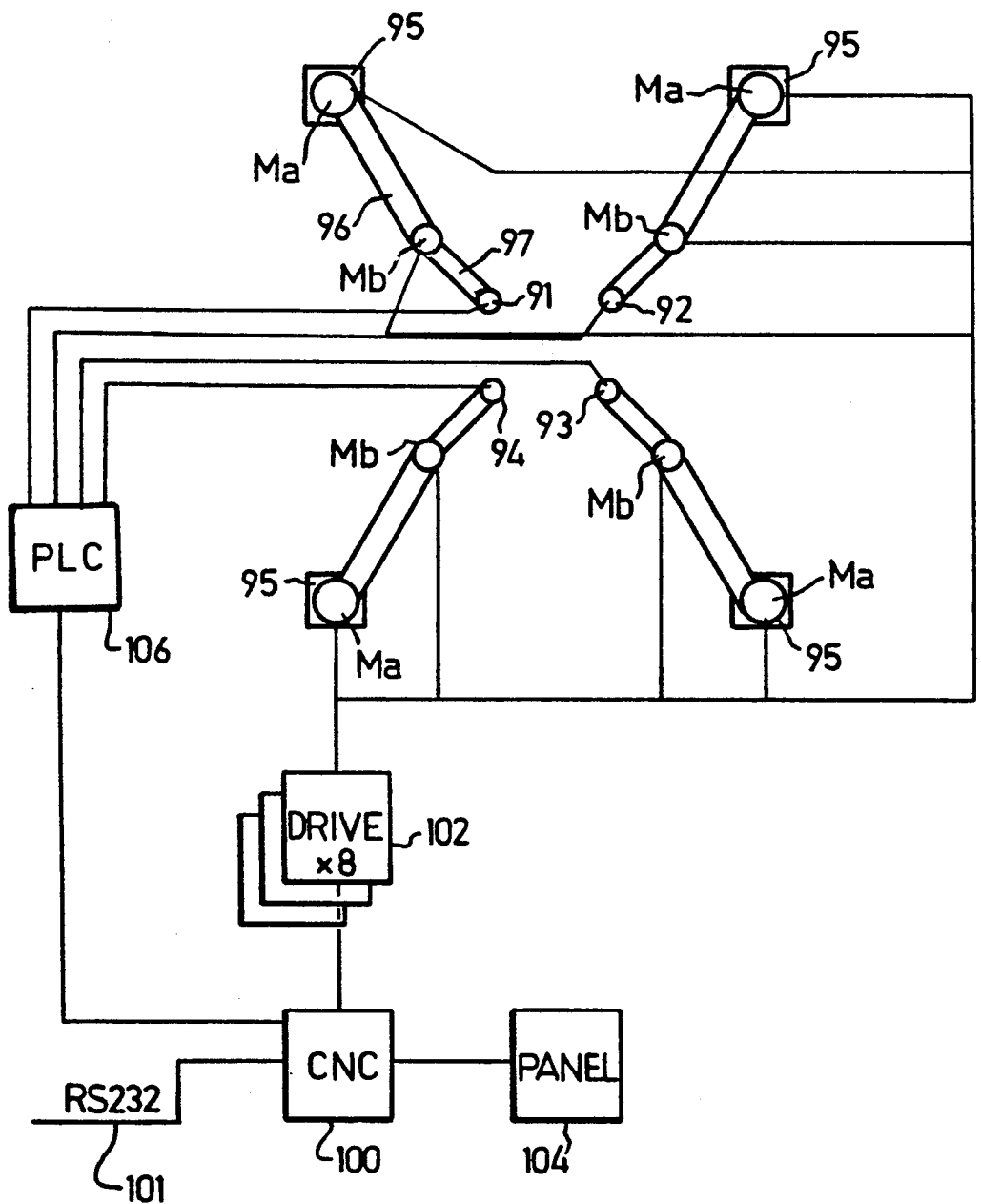
FIG. 9 diagrammatically illustrates the control of the breaking machine of FIG. 7.

Thus, as shown in FIGS. 7–9, the breaking machine 4 comprises four burners 91–94 each supported from a vertical post 95 via two horizontal links 96, 97. Link 96 is horizontally pivotal with respect to the upper end of vertical post 95 by a motor Ma, and link 97 is horizontally pivotal with respect to the outer end of link 96 by a second motor Mb. Each burner 91–94 is carried at the outer end of its respective link 97.

During the breaking operation, the glass blank GB, with the desired contour scored thereon by the scoring machine 2, is supported by the suction cups 52 of the overhead crane 8 over a tub or trough 98 in the breaking machine. The suctions cups engage the glass blank within the scored line such that when the burner 91–94, after having been precisely positioned with respect to the corners of the scored pattern, are energized to apply thermal shocks to the glass blank GB to sever it along the scored pattern. The portion of the glass blank within the scored pattern is thus held by the suction cups, whereas the severed remainder (outer edge portion) of the glass blank falls into the tub 98 as scrap.

FIG. 9 diagrammatically illustrates the controls for the breaking operation. Thus, the breaking machine includes a CNC computer 100 connected by a bus 101 (e.g., an RS 232 bus) to the central computer (28, FIG. 2). CNC computer 100 controls the drive circuits 102 for the eight motors Ma, Mb of the four burners 91–94 (two for each burner), in order to precisely position the burners with respect to the scored lines on the glass blank. The electrical circuit for the breaking machine 4 illustrated in FIG. 9 further includes an operating panel 104 which enables manual or automatic operation of the machine.

As will be described more particularly below, the four burners 91–94 are each positioned with respect to one of the four corners of the scored glass blank so as to apply the heat precisely at the point on the respective corner having the smallest radius of curvature. This positioning of the four burners 91–94 is effected automatically under the control of the CNC computer 100 and the central computer 28. When the four burners are precisely positioned, they are ignited under the control of the CNC computer 100 and the PLC unit 106. The heat applied by the four burners to these precise points in the four corners of the scored glass blank GB produces a thermal shock to the glass blank which neatly severs the score pattern from the remaining outer portion of the blank, permitting the outer portion to fall as scrap within bin 98, while the scored portion is held by the suction cups 52 of the overhead crane 8 which convey it to the grinding machine 6.

The Grinding Machine 6

Figure 10:
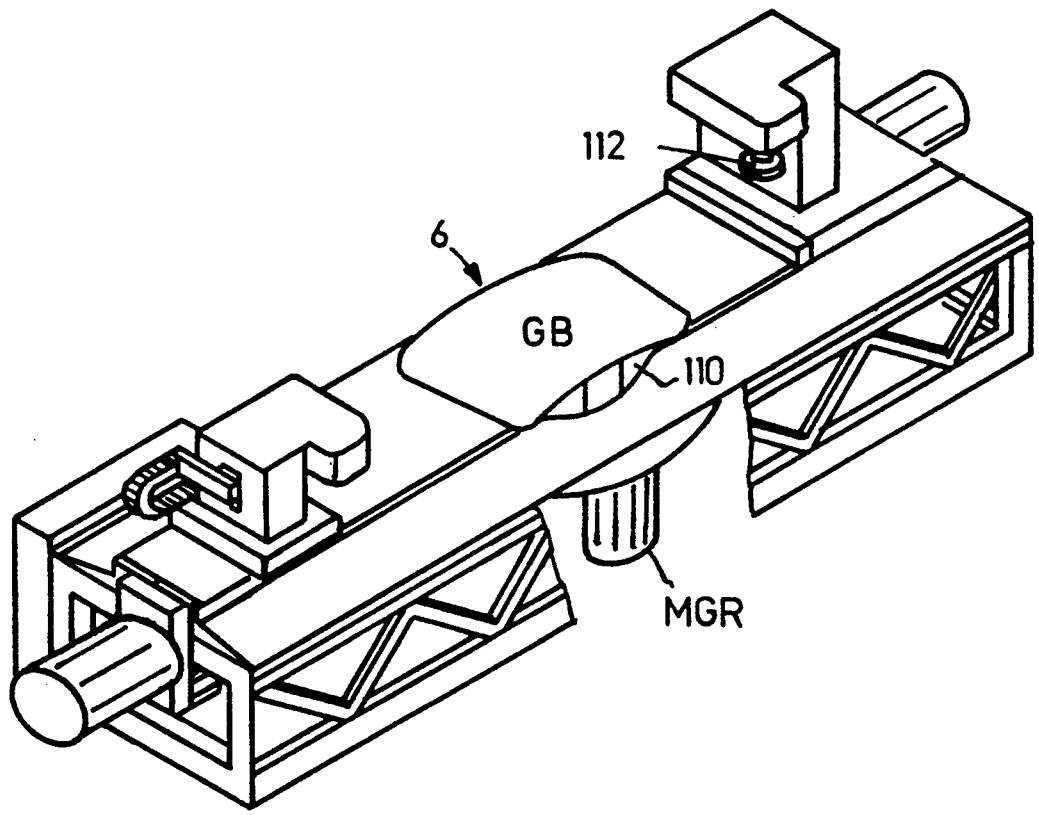
FIG. 10 more particularly illustrates the structure of the grinding machine in the apparatus of FIG. 1 for smoothening the edges of the severed blank.
Figure 11:
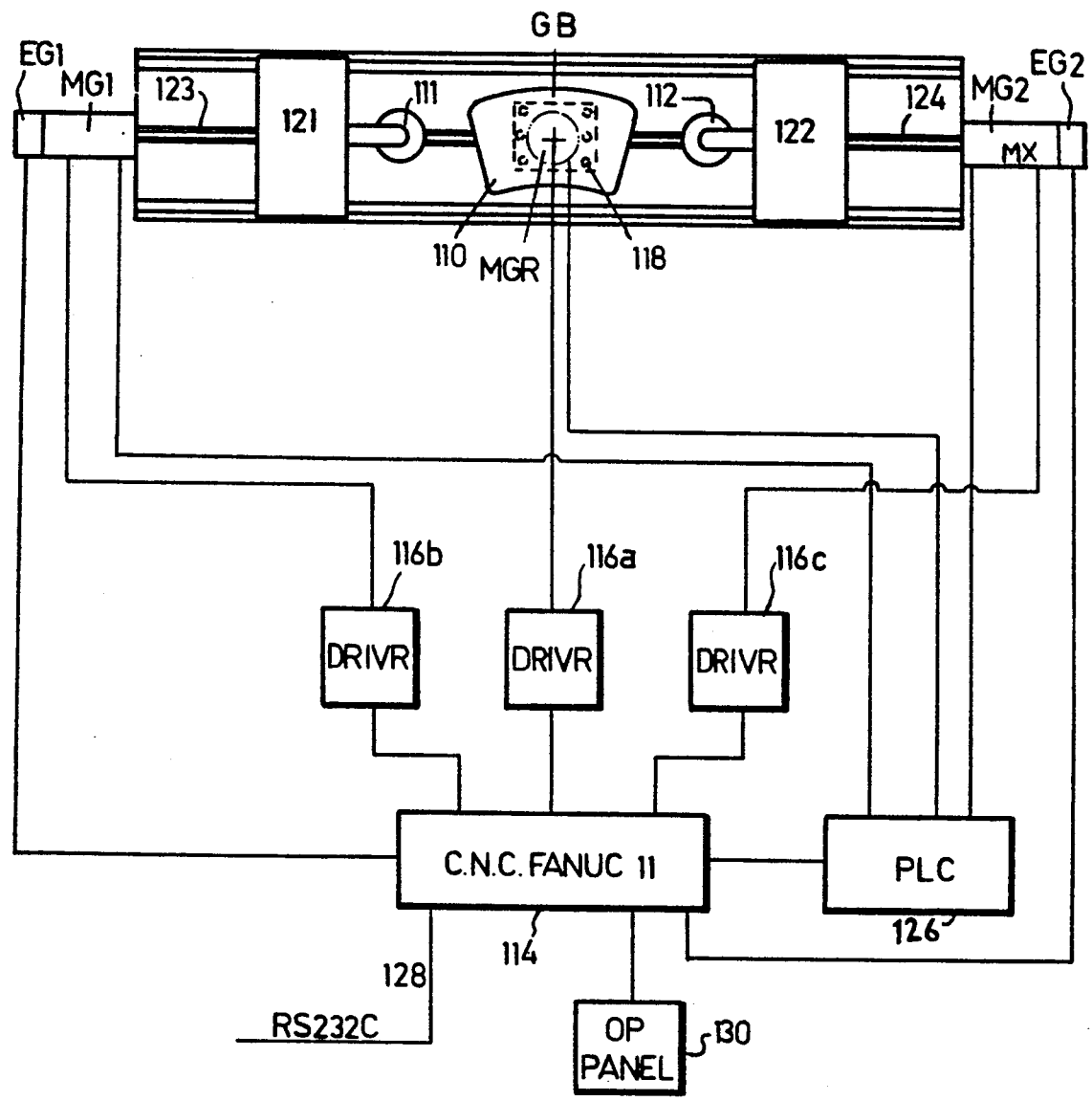
FIG. 11 diagrammatically illustrates the control of the grinding machine of FIG. 9.

The grinding machine 6 illustrated in FIG. 1 is more particularly seen in FIG. 10, and its overall control is diagrammatically illustrated in FIG. 11.

The grinding machine 6 includes a table 110 for receiving the glass blank GB conveyed to it from the breaking machine 4 by the overhead crane 8. The grinding machine further includes a pair of grinding heads 111, 112 (FIG. 11) disposed on opposite sides of the table 110 so as to be engageable with the opposite edges of the glass blank when received on the table. Table 110 is rotatable about the vertical axis of the machine by drive motor $M_{GR}$, whereas the two grinding heads 111, 112 are movable in the longitudinal direction with respect to table 110, i.e., perpendicularly to the rotary axis of the table, by two drive motors $M_{G1}$, $M_{G2}$, so as to grind and smoothen the outer edges of the glass blank as it is rotated on table 110. The provision of two grinding heads 111, 112 (FIG. 11) on opposite sides of the glass blank enables a grinding operation to be performed simultaneously on each of the two opposite edges of the glass blank, thereby substantially decreasing the overall time required for grinding the complete outer edge of the blank.

As shown more particularly in FIG. 11, the grinding machine 6 includes a CNC computer 114 which controls the rotary motor $M_{GR}$ via a drive circuit 116a, and the two grinding head motors $M_{G1}$, $M_{G2}$ via two further drive circuits 116b, 116c. Table 110 receiving the glass blank is formed with vacuum ports 118 to firmly hold the glass blank to the table during the grinding operation. Each of the grinding heads 111, 112 is in the form of a grinding wheel carried by a carriage 121, 122 movable via a ball screw 123, 124 by its respective motor $M_{G1}$, $M_{G2}$.

Grinding machine 6 as illustrated in FIG. 11 further includes a PLC unit 126 for controlling the operations of the three motors $M_{GR}$ $M_{G1}$ and $M_{G2}$, and encoders $E_{G1}$, $E_{G2}$ for providing feed-back information to the CNC computer as to the actual positions of the grinding wheels 111 and 112.

CNC computer 114 further includes a port for connection via an RS 232C bus 128 to the central computer 28 (FIG. 2) for receiving the operative programs, and also providing a communication link to additional systems. An operating panel 130 connected to the CNC computer 114 enables manual or automatic operation of the machine.

Modes of Operation (General)

Figure 12:
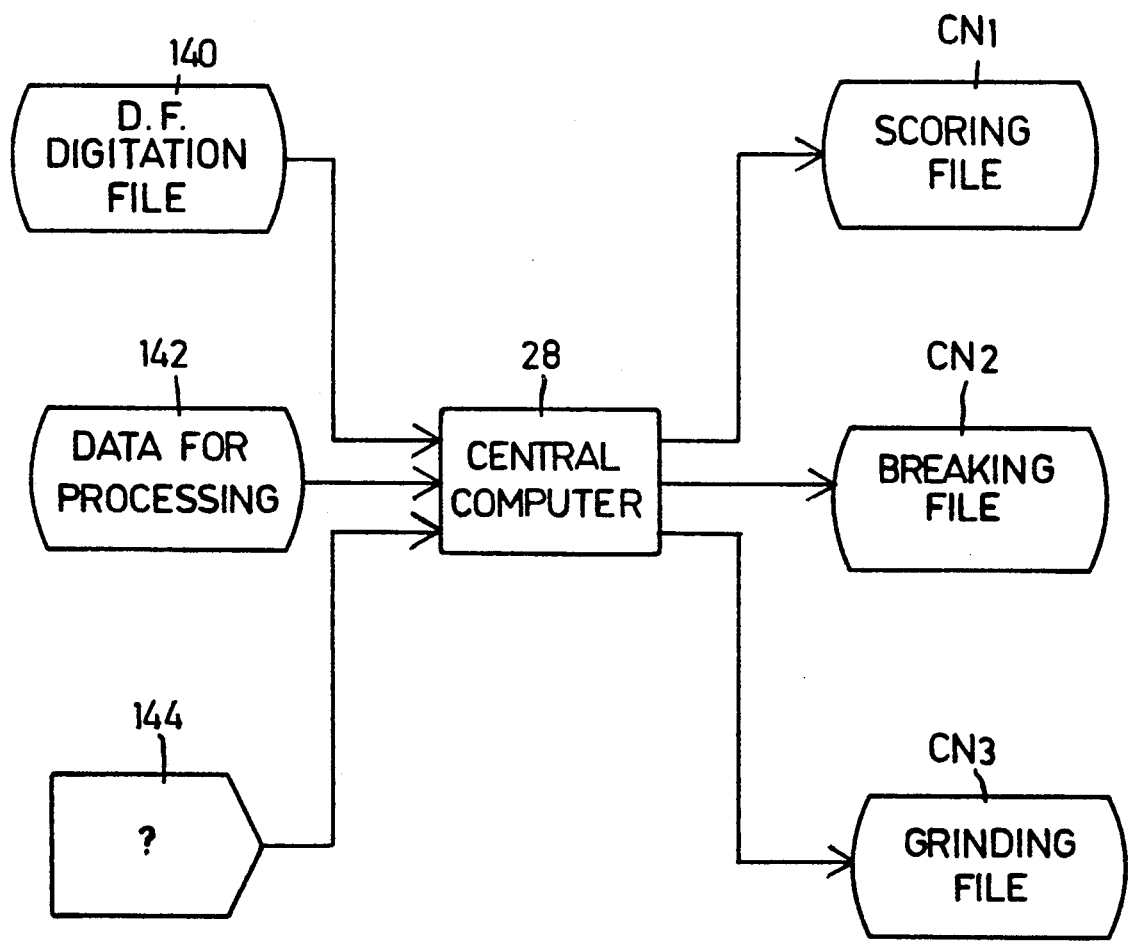
FIGS. 12a-12e illustrate different modes of operation of the overall apparatus of FIG. 1.

The apparatus illustrated in the drawings is capable of operating according to any one of the following modes:

(a) Digitation Mode, illustrated in FIG. 12a. This mode, sometimes called the Study Mode, enables the apparatus to digitize a new contour, as from a model or drawing, to prepare a Digitation File 140 representing the contour to be produced by the apparatus. This Digitation File is produced by using the optical sensor 80 of the scoring machine 2 for digitizing the outer contour under the control of the central computer 28 and also the CNC computer 78 (FIG. 6) of the scoring machine. Both the central computer 28 and the CNC computer 78 for the scoring machine 2 include manual-input devices, as represented by keyboard 30 and display 32 for the central computer 28, and keyboard 78a and display 78b for the CNC computer 78 to enable the manual input of information to be used in producing the Digitation File 140. The operation of the central computer 28 during this Digitation Mode is more particularly described below with respect to the flow diagram of FIG. 14, and the operation of the CNC computer 78 of the scoring machine 2 is more particularly described below with respect to the flow diagram of FIG. 15.

(b) Process Mode, illustrated in FIG. 12b. During this mode of operation, the central computer 28 receives the Digitation File 140 produced during the Digitation Mode of FIG. 12a, and also data from two other sources, namely: relatively constant data 142 with respect to the specific process file to be produced, and manually-inputted data 144, e.g., identifying the particular file. The data from the three sources 140, 142, 144 is processed in the central computer 28 according to a Process Program to produce three files, namely: a Scoring File CN1, to be used for controlling the scoring machine 2; a Breaking File CN2, to be used for controlling the breaking machine 4; and a Grinding File CN3, to be used for controlling the grinding machine 6.

In producing the three files CN1, CN2, CN3, the information with respect to the specific contour to be cut and ground is supplied by the Digitation File 140, whereas the relatively constant parameters of the respective process are supplied from the Data File 142. Manual input 144 is used mainly for specifying the file name.

The operation of the central computer 28 during the Process Mode of operation, to prepare the three files CN1, CN2 and CN3, is described more particularly below with respect to the flow diagram of FIGS. 16a, 16b and 16c.

Figure 12C:
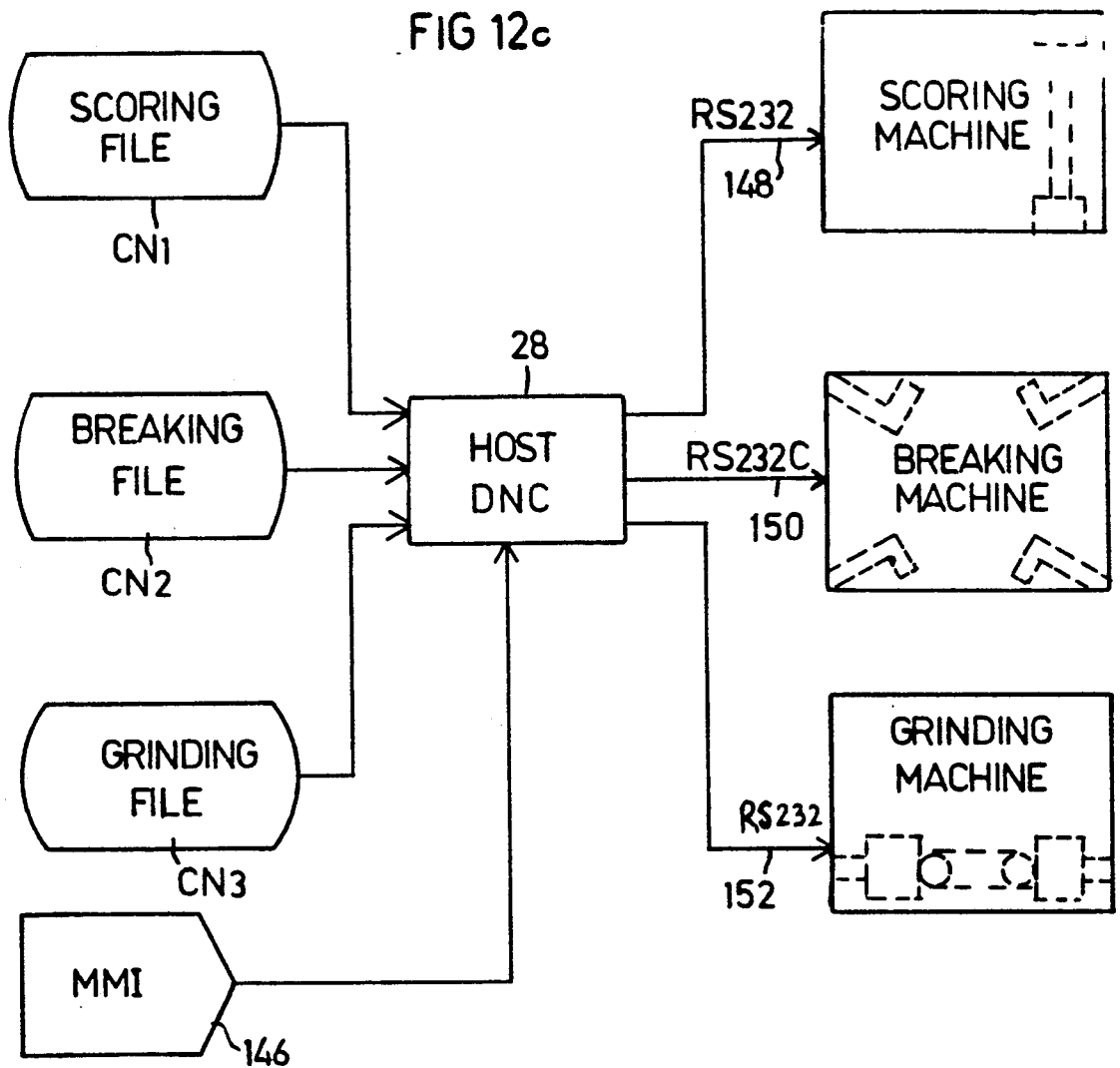

(c) DNC Mode, illustrated in FIG. 12c. The DNC (Direct Numerical Control) mode is the actual manufacturing operation, in which the central computer 28 receives the information from the Scoring File CN1, the Breaking File CN2, and the Grinding File CN3, all prepared in the Process Mode illustrated in FIG. 12b, togeher with man-machine interface (MMI) information 146 manually inputted via keyboard 30 and display 32 of the central computer 28, and controls, via the three busses RS 232 busses 148, 150, 152, respectively, the scoring machine 2, breaking machine 4, and grinding machine 6, as the glass blank GB is advanced from one machine to the next by the overhead crane 8. The three files CN1, CN2 and CN3 prepared during the Process Mode include the necessary data and format so as to be usable by the CNC computers in each of the three machines 2, 4 and 6, to control the operation of the respective machine in the conventional manner as known in CNC-operated systems.

Figure 12D:
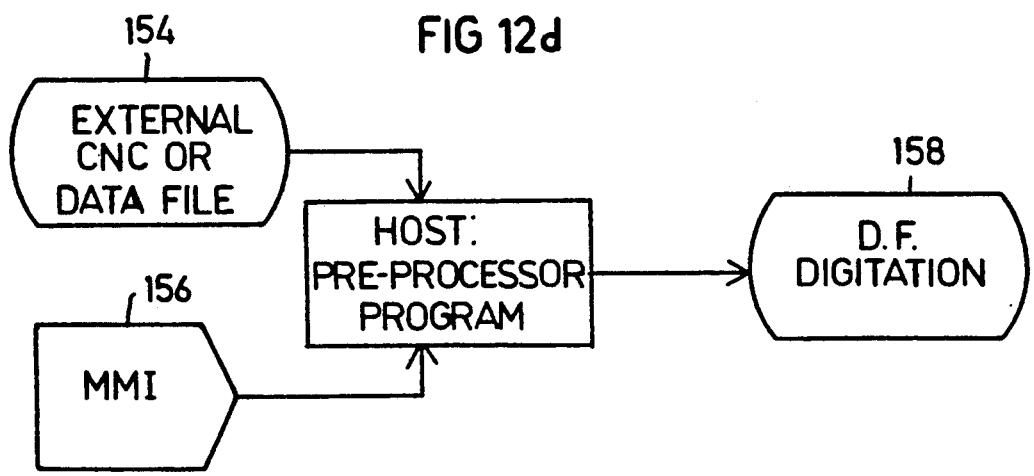

(d) Pre-Process Mode, illustrated in FIG. 12d. This mode is used to prepare a Digitation File, corresponding to Digitation File 140 in FIG. 12a, from externally-derived data, i.e., from data that was not prepared during the above-described Digitation Mode of operation of FIG. 12a. For example, this externally-derived data may be data obtained from a manual digitation process, previously-existing digitized data, or data resulting from a CAD (computer-aided design) or CAM (computer-aided manufacture) system. In such cases, the central computer 28 receives this externally-derived data 154, and also MMI data 156 manually-inputted from keyboard 30 and display 32 of the central computer 28, and produces a Digitation File, designated 140' in FIG. 12d, corresponding to Digitation File 140 in FIG. 12a. File 140' may thus be used in the Process Mode of FIG. 12b for producing the three CNC files CN1, CN2 and CN3, for controlling the scoring machine 2, breaking machine 4, and grinding machine 6, respectively, during a DNC mode of operation, in the same manner as described above, except that in this case the three files are produced from externally derived data, rather from that derived in the above-described Digitation Mode of FIG. 12a.

Figure 12E:
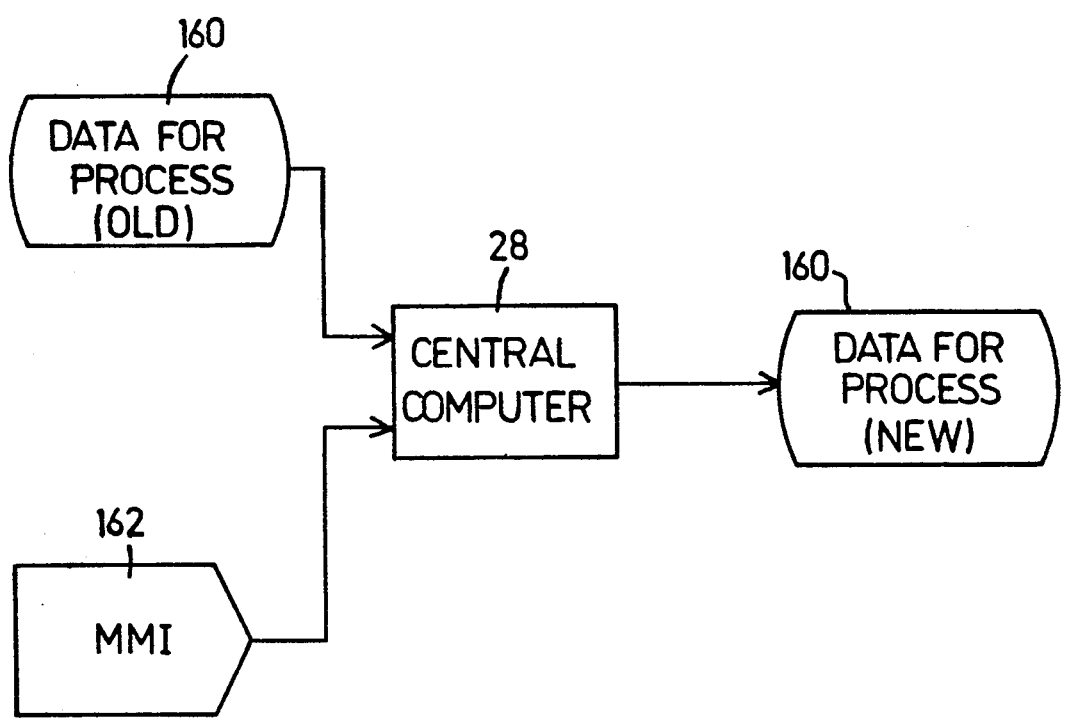

(e) Data Modification Mode, illustrated in FIG. 12e. This mode is used to make changes in the basic data of any of the foregoing files, e.g., in order to update the file. During this mode of operation, the central computer 28, but with a data-modification program, receives one of the above-described data CN1, CN2, CN3, 140 or 140', and also MMI information containing the modification data for updating the respective file, which MMI information is manually inputted via the keyboard 30 and display 32 of the central processor 28.

The foregoing modes of operation are implemented by providing the central computer 28, or the CNC computer in the respective scoring machine 2, breaking machine 4, and grinding machine 6, with the appropriate program, as will be described more particularly below.

Coordinate System

Figure 13:
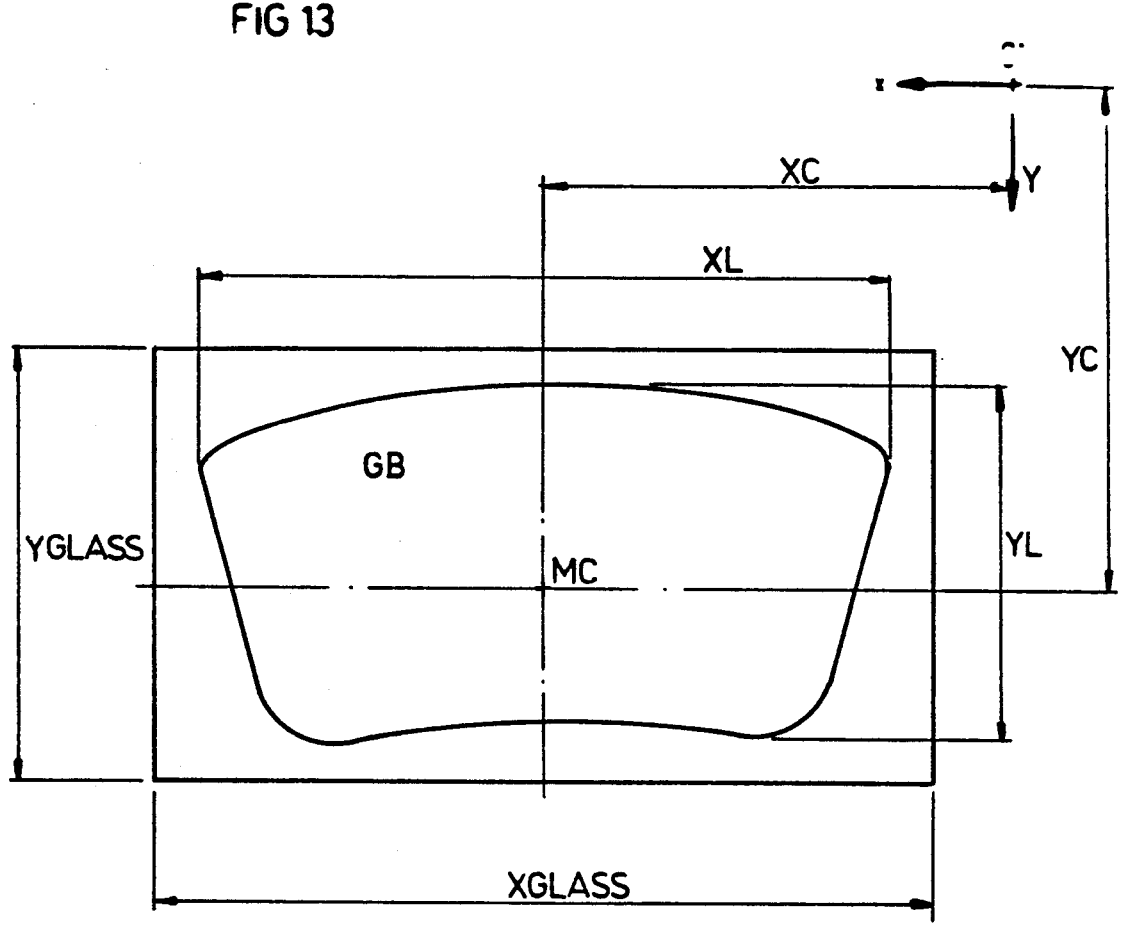
FIG. 13 illustrates the coordinate system used in controlling the machine operations.

FIG. 13 illustrates the coordinate system upon which all the machine operations are based.

Thus, the scoring machine 2 includes a reference center point, indicated as "01" in FIG. 13, which is the reference center of the machine. That is to say, all dimensions relating to the operations performed by the scoring machine are set forth in the X-direction and Y-direction with respect to this center reference point "01".

On the other hand, the scoring machine 2, as well as the breaking machine 4 and the grinding machine 6, each includes a theoretical center, designated "MC" (machine center) in FIG. 13. The glass blank GB includes a corresponding reference center MC. When the overhead crane 8 conveys the glass blank GB from one machine to the next, it locates the center point MC of the glass blank GB on the center point MC of the respective machine. All the command instructions are then given with respect to the distance between the glass blank center point MC and the machine center point "01" along the X-axis (dimension "XC" in FIG. 13), and along the Y-axis (dimension "YC").

In FIG. 13, the dimensions of the raw glass blank GB are set forth as "XGLASS" along the X-axis, and as "YGLASS" along the Y-axis; whereas the maximum dimensions of the contour to be cut in the glass blank are set forth as "XL" along the X-axis, and as "YL" along the Y-axis.

Implementation of the Digitation Mode

Figure 14:
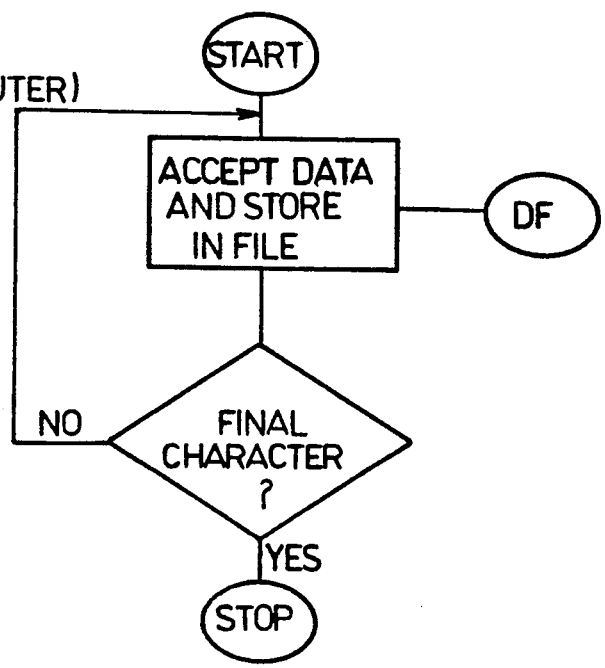

As briefly described above, the Digitation Mode (also called the Study Mode) as illustrated in FIG. 12a, utilizes the scoring machine 2, and particularly its optical sensor 80, to digitize a new contour, as from a model or drawing, to prepare a Digitation File 140 representing the contour to be produced by the apparatus; this Digitation File is used during the subsequent Process Mode (FIG. 12b) for producing the three CNC files CN1, CN2, CN3, which are used in the DNC (or Production) Mode to control the scoring machine 2, breaking machine 4 and grinding machine 6, respectively. FIG. 14 is a flow diagram illustrating the programmed operations of the central computer 28 during the Digitation Mode, whereas FIG. 15 is a flow diagram illustrating the programmed operations of the CNC computer 78 (FIG. 6) for controlling the scoring machine during the Digitation Mode.

Thus, as shown in the flow diagram of FIG. 14, the central computer 28 asks for the data from the CNC computer 78, including the name of the file and data of the coordinate points, this data being transmitted to the central computer 28 from the CNC computer 78 via bus 82 (FIG. 6). The central computer 28 carries out a check on the contents of this information by standard check-sum procedures, and also asks, upon receiving each data bit, whether this is the final character. If not, it continues to accept data and to store it in the Digitation File DF. When the final character has been received, the digitation procedure is terminated.

Figure 15:
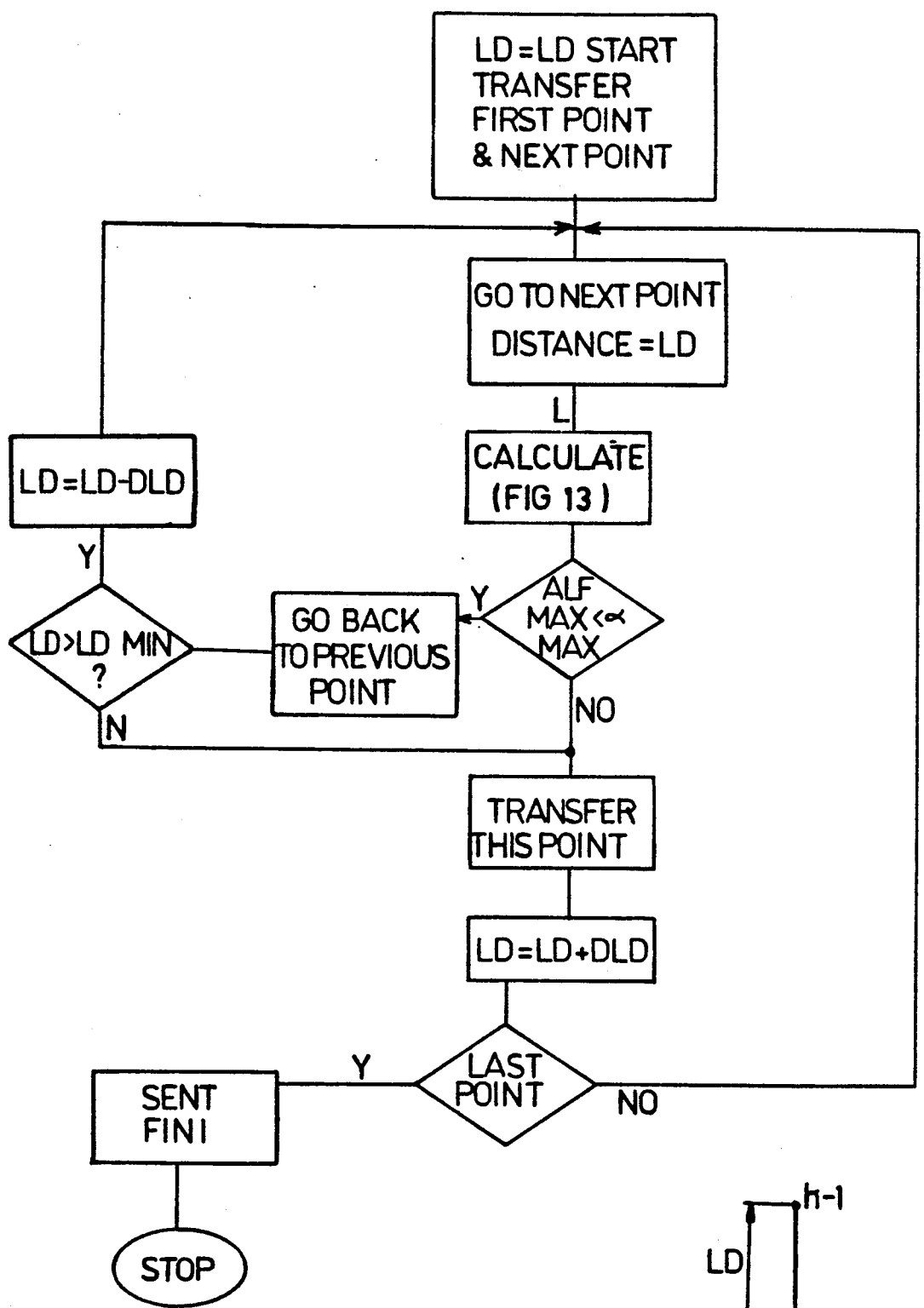
FIG. 15 is a flow diagram illustrating the operation of the CNC computer in the Digitation (or Study) Mode of operation illustrated in FIG. 12a, FIG. 15a being a diagram helpful in understanding this Mode of operation.

The program of the CNC computer 78 (FIG. 6) during the Digitation Mode is somewhat more complicated as is illustrated in FIG. 15. This program involves a parameter, called "LD", which represents the maximum distance from one sample point to the next during the digitation procedure. The program involves two related parameters, namely DLD, representing a distance to be subtracted from distance LD during the operation of the program, and $LD_{MIN}$, representing a minimum distance LD. As one example, LD may be 30 mm, DLD may be 5 mm, and $LD_{MIN}$ may be 1 mm.

Figure 15A:
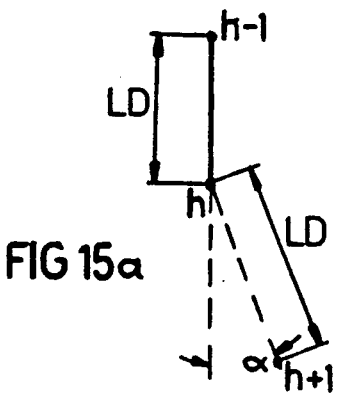

The flow diagram illustrated in FIG. 15 for controlling the CNC computer 78 during the Digitation Mode involves another parameter called "$\alpha$", and its related parameter "$\alpha_{MAX}$". The significance of this parameter, and its relation to the distance "LD", is more particularly shown in the diagram of FIG. 15a, illustrating the Digitation Mode as applied to three successive points, namely point "n−1", point "n", and point "n+1", the contour being digitized.

With reference to the flow diagram illustrated in FIG. 15, the CNC computer 78 (FIG. 6) of the scoring machine 2, during the Digitation Mode, samples the first point (n−1, FIG. 15a), and transfers the value of that point to the central computer 28. The CNC comnputer 78 then, by a standard skip function, executes a step the distance LD along the Y-axis, and then samples the next point (n, FIG. 15a), and transfers this value to the central computer 28. The CNC computer 78 then samples the third point (n+1, FIG. 15a) and calculates the angle "$\alpha$" between the line of points "n" and "n+1" and the extension of the line of points "n−1" and "n". If this angle "$\alpha$" is smaller than a specified "$\alpha_{MAX}$", the computer transfers the data of point "n+1" to the CNC computer 78, and proceeds to the next sample point equal to the distance "LD" from point "n+1" However, if "$\alpha$" is larger than a specified "$\alpha_{MAX}$", the computer goes back to the previous point "n", checks to see whether "LD" is greater than a specified $LD_{MIN}$, and if so, subtracts the distance "DLD" from LD, and then returns to the new point LD, which has been reduced from the original distance LD by the distance DLD. On the other hand, if the distance "LD" is less than the specified $LD_{MIN}$, the program accepts that data and transfers this point to the central computer 28 for inclusion in the Digitation File, then adds the distance DLD to the distance LD, and checks to determine whether this is the last point. If not, the program proceeds to the next point wherein the above procedure is repeated with respect to that point. When the last point has been detected, the program is completed.

It will thus be seen that the program illustrated by the flow diagram in FIG. 15 for operating the CNC computer 78 of the scoring machine 2 during the Digitation Mode causes the sensor 80 (FIG. 6) to sense the contour of the model or drawing at relatively large distances LD (e.g., 30 mm) where the contour has a relatively large radius of curvature, as indicated by the angle "$a$" being relatively small. However, where the radius of curvature is relatively small, indicated by angle "$a$" being larger than "$a_{MAX}$", the maximum distance LD (e.g, 30 mm) is reduced by a specified distance DLD (e.g., 5 mm) in one or more successive operations until the measured angle "$a$" is less than "$a_{MAX}$", so as to provide more closely-spaced sample points at the portions of the contour having a relatively small radius of curvature. However, whenever this sample distance LD is reduced below a specified minimum $LD_{MIN}$ (e.g., 1 mm), no further reduction is made in the sample distance, and the measurement is taken at that point and transferred to the central computer 28 for inclusion in the Digitation File.

The parameters LD, DLD, and $LD_{MIN}$, as well as $a_{MAX}$ (e.g., 4°), are included within the constant parameters file 79 inputted into the CNC computer 78 (FIG. 12a) during the Digitation Mode. These parameters are relatively constant for each model of windshield to be manufactured, but can be changed whenever required.

Implementing the Process Mode

As described earlier, during the Process Mode illustrated in FIG. 12b, the central computer 28 receives the Digitation File 140 produced during the Digitation Mode of FIG. 12a, as well as other data from file 142 and manually-inputted data 144, and produces the three CNC files, CNC1, CNC2 and CNC3, to be used for controlling the CNC computers in the scoring machine 2, breaking machine 4 and grinding machine 6 during the DNC (Manufacturing) mode of operation of the system. FIGS. 16a, 16b, 16c, taken together, represent a flow diagram of the program in the central computer 28 for implementing this Process Mode of operation.

Figure 16A:
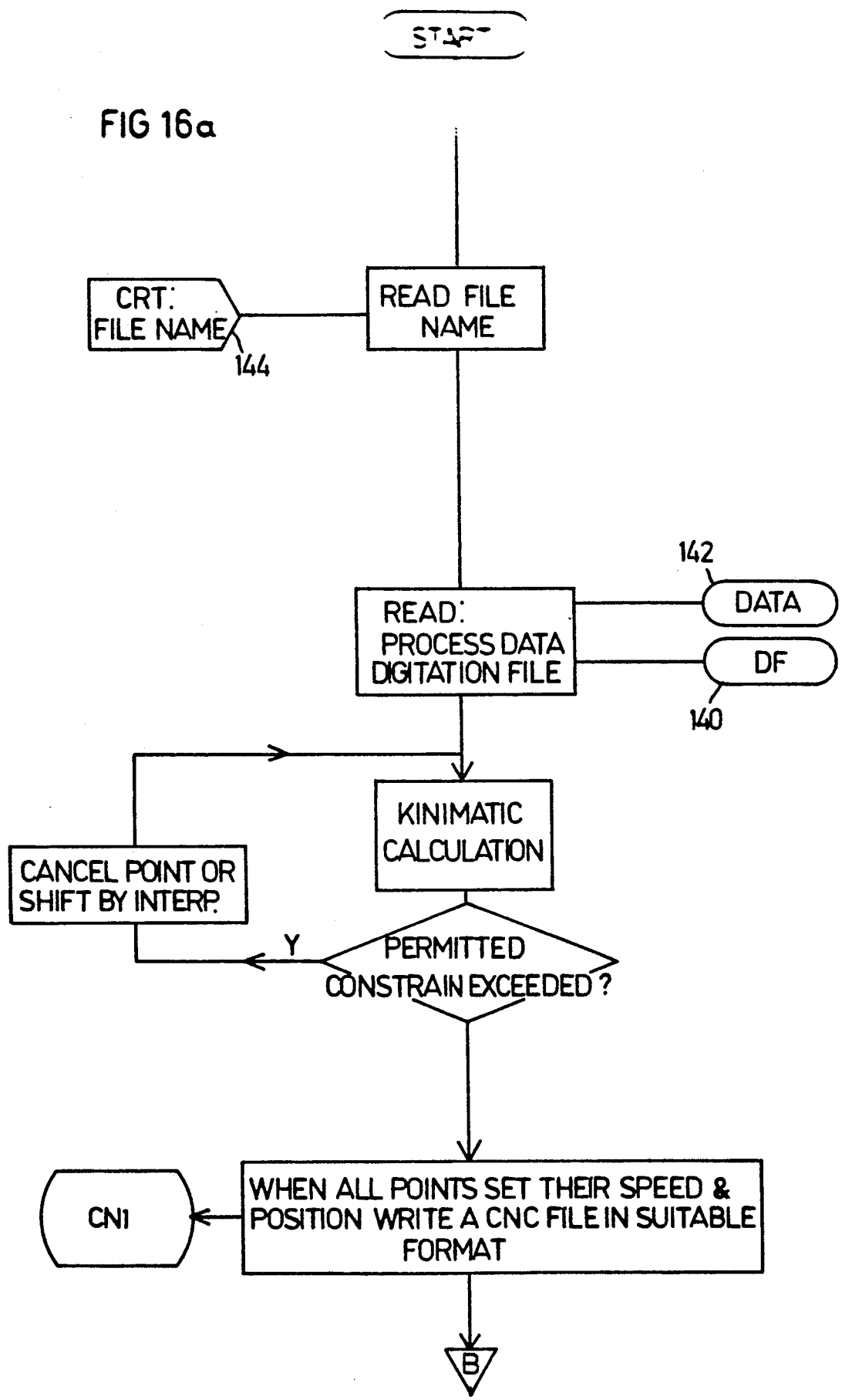
FIGS. 16a-16c, taken together, constitute a flow diagram illustrating the operation of the central computer in the Process Mode of operation of FIG. 12b.

As shown in FIG. 16a, the system first reads the file name from the manually-inputted information 144, and then reads the process data from data file 142 and the digitation data from the Digitation File 140. The process data of data file 142 contains all the relatively constant values for the respective process, e.g., the distances XC, YC (FIG. 13) of each machine with respect to the machine center MC of the glass blank GB; the starting points of the carriage 70 of the scoring machine 2, of the burners 91-94 of the breaking machine 4, and the grinding wheels 111, 112 of the grinding machine 6; the starting angles for each of the links 96, 97 of the breaking machine 4; the time of energization of the burners 91-94 in the breaking machine 4; the diameter of the grinding wheels 111, 112; the maximum accelations and speed allowed for moving the various elements in the three machines, etc. As indicated earlier, the data of file 142 is relatively constant, but can be changed or updated, whenever required, by using the Data Modification Mode illustrated in FIG. 12e.

As shown in the flow diagram of FIG. 16a, the computer first starts to perform the processing for the scoring machine in order to prepare the scoring machine file CN1.

The computer initially makes the necessary kinematic calculations to determine whether it is within certain permitted constraints, as specified in the data file 142. One constraint is maximum velocity allowed for each axis; for example, this may be 40 meters per minute. The computer also calculates the maximum acceleration (or deceleration) in changing speeds to determine whether this is also within the permitted constraints, as an excessive acceleration (or deceleration) may overload the drive or cause mechanical damage to the system. If the maximum velocity or acceleration is exceeded, the system cancels that point, reduces the velocity, and then makes new kinematic calculations, until the permitted constraints of velocity and acceleration, as well as of processing time, are not exceeded.

The foregoing kinematic calculations are well-known in CNC machines, and therefore further details of such a procedure are not set forth herein.

When all the points have been determined within the permitted constraints, the information is outputted as the CN1 file, for subsequent use in controlling the scoring machine 2. The computer then proceeds to process the data for preparing the CNC file CN1 for controlling the breaking machine 4.

Figure 16B:
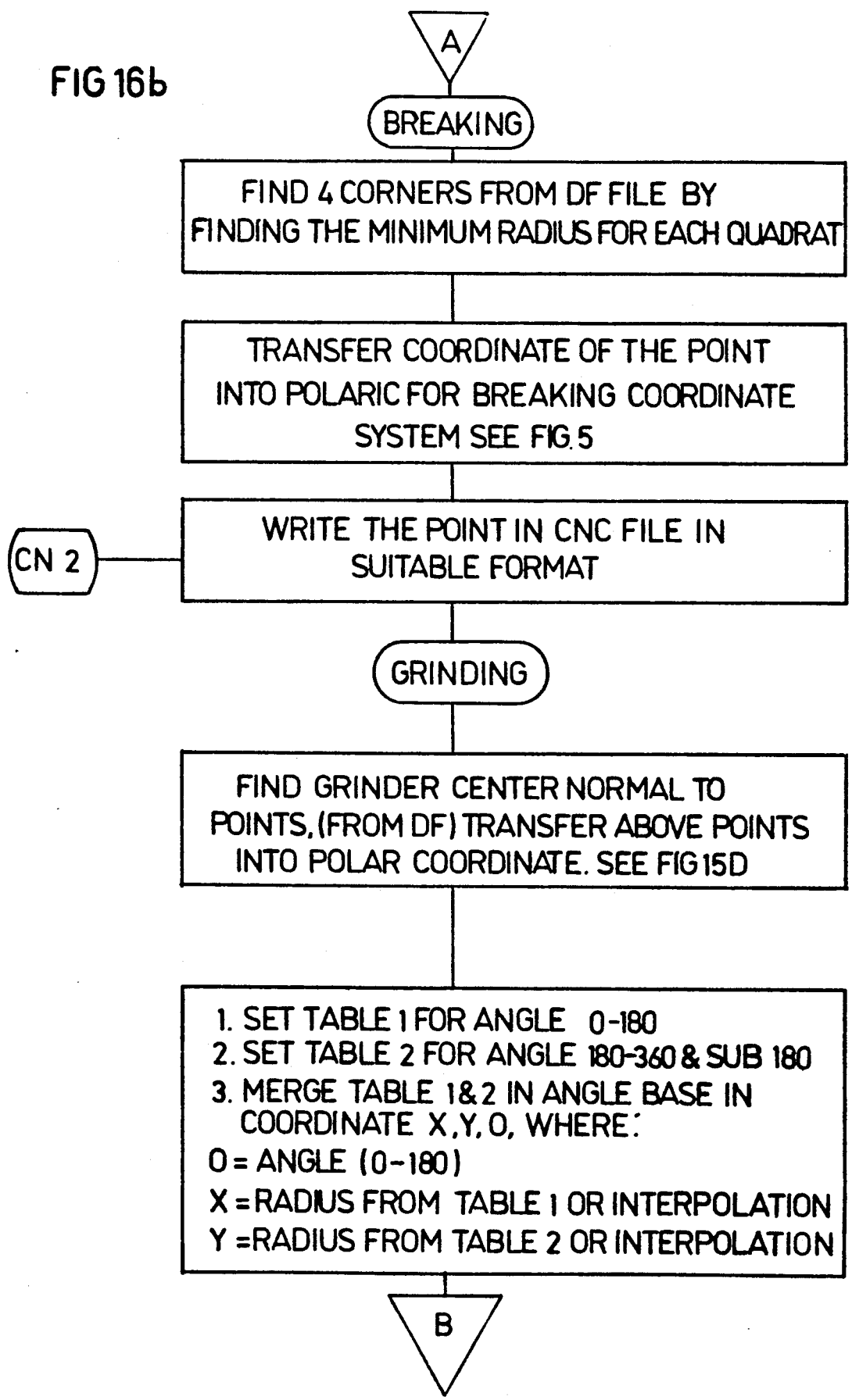

As shown in the flow diagram of FIG. 16b, for preparing the breaking machine file CN2, the computer first finds the four corners of the contour as set forth in the Digitation File by locating the point of minimum radius of curvature in each of the four quadrants of the contour scored on the glass blank GB. This information, identifying the points of smallest radius of curvature at each of the four corners of the contoured glass blank, is translated to the angles A11 (FIG. 8) of link 96 with respect to its post 95, and the angle A12 of link 97 with respect to link 96, for each of the four burners 91-94; this locates the respective burner precisely at the point of minimum radius of curvature on the respective corner of the contour scored on the glass blank GB.

Since the lengths of links 96 and 97 are known for each of the four burners 91-94, and since the point of minimum radius of curvature of each burner has been determined, it is a matter of simple mathematical calculations to determine angles A11 and A12 to position the respective burner at this precise point of minimum radius of curvature. The controls of the two motors Ma and Mb for each burner 91-94 to precisely position its respective burner according to these calculated angles are transferred to the CNC file CN2, to be used for controlling the breaking machine during the breaking operation. The computer then proceeds to prepare the CNC file CN3 for controlling the grinding machine 6.

Figure 17:
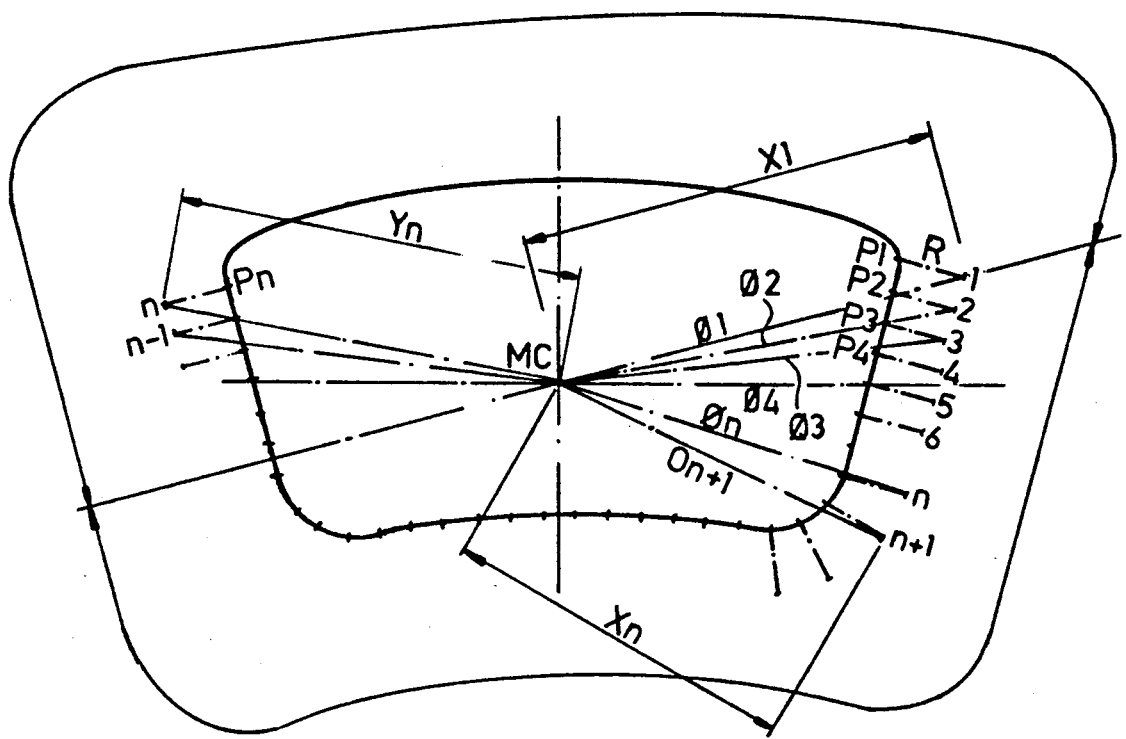
FIG. 17 is a diagram helpful in explaining the grinding operation.

The first step in preparing the grinding file CN3 is to find the location of the center of each grinding wheel 111, 112 (FIG. 11) for each point on the outer surface of the finished contour of the glass blank GB. In FIG. 17, the points on the outer contour of the finished glass blank GB are indicated by points $P_1-P_n$; and the corresponding centers of the grinding wheels 111, 112 corresponding to these points are indicated at $G_1-G_n$.

In determining the grinder center points $G_1-G_n$, a line "R" is drawn from its corresponding glass blank point $P_1$ normal to the line between that point and the preceding point, for the distance (R) corresponding to the radius of the respective grinding wheel 111, 112.

Each of the grinder-center points $G_1$-$G_n$ is defined by polar coordinates. For this purpose, a line ($X_1$ for point $G_1$) is drawn from the machine center MC of the glass blank GB to the respective point $G_1$, so that point $G_1$ is defined with respect to the machine center MC by the length of the line ($X_1$), and the angle ($\theta_1$) between the line and a horizontal line through the machine center MC.

Next, a table is prepared defining the positions of the two grinding wheels 111, 112 for each of the angles ($\theta$) around the circumference of the contour in the finished glass blank. Because the glass blank is ground during the grinding operation simultaneously by the two grinding wheels 111, 112, on opposite sides of the glass blank, such a table is prepared only for 180° rotation of the glass blank, in the following manner:

First, a table is prepared of the angles O and distances X for the complete 360° according to the following table A:

TABLE A

| . | X |
|---|---|
| 10 | 100 |
| 100 | 150 |
| 150 | 140 |
| 200 | 120 |
| 250 | 110 |
| 300 | 150 |
| 360 | 170 |

Table $B_1$ is then prepared setting forth the values of X for the angle (O) of 0°-180°, and table $B_2$ is prepared setting forth the values of Y for the angles 181°-360° after subtracting the 180°, both as set forth below:

TABLE $B_1$

| . | X |
|---|---|
| 10 | 100 |
| 100 | 150 |
| 150 | 140 |

TABLE $B_2$

| . | Y |
|---|---|
| 200 − 180 = 20 | 120 |
| 250 − 180 = 70 | 110 |
| 300 − 180 = 120 | 150 |
| 360 − 180 = 180 | 170 |

A new table C is then prepared merging tables $B_1$ and $B_2$, as shown below:

TABLE C

| . | X | Y |
|---|---|---|
| 10 | 100 | |
| 20 | | 120 |
| 70 | | 110 |
| 100 | 150 | |
| 120 | | 150 |
| 150 | 140 | |
| 180 | | 170 |

While each of the above tables includes only a few items, it will be appreciated that these are set forth merely for illustrative purposes, and that each table will include a considerably larger number of items. For example, tables A and C may each include about 400 items, dividing the circumference of the glass blank to 400 points each separated from the next by less that 1°. The spaces between the points can be filled by interpolation.

It will thus be seen that table C determines the positions of the two grinding wheels 111, 112 during the grinding operation, in which the complete 360° circumference of the glass blank is engaged by the grinding wheels even though the glass blank is rotated only 180°.

After the positions of the grindings wheels have been thus determined, the kinematic calculations, described above with respect to the preparation of file CN1, are also made in order to assure that the maximum acceleration and velocity constraints are not exceeded. If any point does exceed one of these constraints, a change is made in the point until the constraint is not exceeded.

When all the points for controlling the grinding wheels 111, 112 have thus been determined, these points are outputted to the CN3 file, which is used to control the grinding machine 6 during the grinding operation.

Figure 16C:
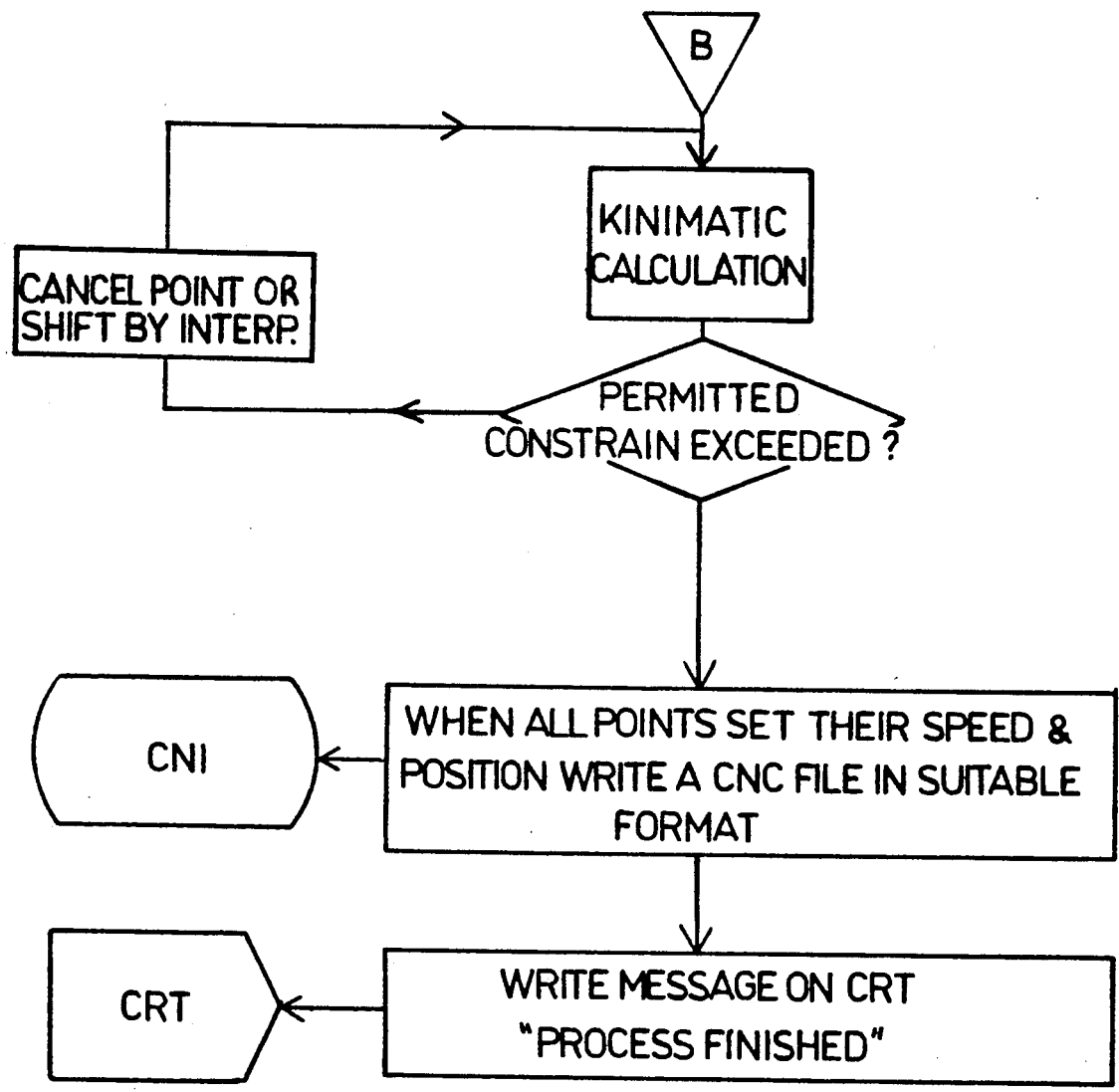

When this procedure has been completed, the Process Mode of operation illustrated in FIGS. 16a-16c is completed.

The three files CN1, CN2, CN3, prepared during the Process Mode of operation illustrated in FIGS. 16a-16c, may then be used during the DNC for controlling, via the central computer 28, the operation of the scoring machine 2, breaking machine 4 and grinding machine 6. During this DNC mode of operation, the central computer 28 is also provided with MMI information, as shown at 146 in FIG. 12c, which is manually inputted via the central computer keyboard 30 and display 32.

The Pre-Process Mode illustrated in FIG. 12d, used to prepare a digital file corresponding to the Digitation File 140 in FIG. 12a from externally-derived data rather than from the data digitized by the scoring machine 2 during the Digitation Mode of operation, may be used in the same manner as described above with respect to the Digitation Mode of operation illustrated in FIG. 12a for preparing the Digitation File 140 corresponding to the externally-derived data. In addition, the Data Modification Mode of operation illustrated in FIG. 12e, which is used to make changes in the basic data of any of the foregoing files (e.g., in order to update the file) is controlled by the central computer 28 in a conventional manner as shown in FIG. 12e to update the old data as appearing in file 160 in FIG. 12e with the modifying data 162 as manually inputted into the central computer 28, to produce the modified data file 160'.

The central computer 28 may be one of the many available personal computers, e.g., IBM PC; and each of the CNC computers used in the three machines 2, 4, 6 (e.g., CNC computer 78 used in the scoring machine 2 as illustrated in FIG. 6) may be a FANUC 11.

While the invention has been described with respect to one preferred embodiment, it will appreciated that many other variations, modifications and applications of the invention may be made.

What is claimed is:

1. Apparatus for cutting glass blanks according to a particular contour, comprising:
   a scoring machine including a separate drive therefor for scoring the contour on the glass blank;
   a breaking machine for severing the scored contour from the glass blank;
   a grinding machine including a table for supporting the glass blank, two grinding heads on opposite sides of said table, and a motor for driving each of said grinding heads, for smoothing the edges of the severed blank;

a conveyor for conveying the glass blank to each of the above machines for performing their respective scoring, severing and grinding operations thereon; and a control system for controlling said scoring machine including its separate drive according to a digital scoring file, for controlling said breaking machine according to a digital breaking file, and for controlling said grinding machine including said two grinding head motors according to a digital grinding file.

2. The apparatus according to claim 1, wherein said control system includes a separate computer for each of said machines.

3. The apparatus according to claim 1, wherein said scoring machine further comprises an edge sensor for sensing the contour of a model or drawing of a glass blank to be cut, and means controlled by said edge sensor for preparing a digital contour file representing said contour; said control system further including a computer programmed to utilize said digital contour file for preparing said digital scoring, breaking and grinding files.

4. Apparatus for cutting glass blanks according to a particular contour, comprising:

a scoring machine including a separate drive therefor for scoring the contour on the glass blank;

a breaking machine for severing the scored contour from the glass blank;

a grinding machine including a table for supporting the glass blank, two grinding heads on opposite sides of said table, and a motor for driving each of said grinding heads, for smoothing the edges of the severed blank;

a conveyor for conveying the glass blank to each of the above machines for performing their respective scoring, severing and grinding operations thereon;

and a control system for controlling said scoring machine including its separate drive according to a digital scoring file, for controlling said breaking machine according to a digital breaking file, and for controlling said grinding machine including said grinding head motors according to a digital grinding file;

said scoring machine further comprising: a table for supporting the glass blank after conveyed thereto by a conveyor; a first carriage movable by the scoring machine drive along a first axis with respect to said table; a second carriage movable by said scoring machine drive along a second axis with respect to said table perpendicular to said first axis; a scoring head; and mounting means for mounting said scoring head and edge sensor to said second carriage.

5. The apparatus according to claim 4, wherein said scoring machine further comprises mode selector means to select a digitization mode wherein the second carriage is moved with respect to the table to cause the edge sensor to digitize the outer contour of a model or drawing on the table, or to select a scoring mode wherein the second carriage is moved with respect to the table to cause the scoring head to score a preprogrammed contour on a glass blank supported on the table.

6. The apparatus according to claim 5, wherein said scoring machine drive includes a first motor for driving the first carriage along said first axis, and a second motor for driving the second carriage along said second axis; said first carriage and said second carriage each including an encoder for encoding the positions of the first and second carriages, respectively.

7. Apparatus for cutting glass blanks according to a particular contour, comprising:

a scoring machine including a separate drive therefor for scoring the contour on the glass blank;

a breaking machine for severing the scored contour from the glass blank;

a grinding machine including a table for supporting the glass blank, two grinding heads on opposite sides of said table, and a motor for driving each of said grinding heads, for smoothing the edges of the severed blank;

a conveyor for conveying the glass blank to each of the above machines for performing their respective scoring, severing and grinding operations thereon;

and a control system for controlling said scoring machine including its separate drive according to a digital scoring file, for controlling said breaking machine according to a digital breaking file, and for controlling said grinding machine including said grinding head motors according to a digital grinding file;

said breaking machine comprising a plurality of heating devices, and positioning means for positioning each of said heating devices with respect to a glass blank on the table; said control means including programmed means for controlling said positioning means to position each of the heating devices in alignment with the point of the smallest radius of curvature in each corner of the scored glass blank on the table; and means for energizing said heating devices when properly located with respect to the scored glass blank to apply a thermal shock to the glass blank such as to sever the scored contour from the glass blank.

8. The apparatus according to claim 7, wherein each of said heating devices is supported on a vertical pole, and each of said positioning means comprises a first link horizontally pivotable to the respective vertical pole by a first motor, and a second link horizontally pivotable to the first link by a second motor, each of said heating devices being mounted on the end of its respective second link.

9. The apparatus according to claim 7, wherein said conveyor includes vacuum means for gripping the scored blank within the scored contour thereof; and said breaking machine comprises a receptacle underlying said heating devices for receiving the glass scrap resulting from the severing of the scored blank by the thermal shock applied by said heating devices.

10. The apparatus according to claim 7, wherein said heating devices are burners.

11. Apparatus for cutting glass blanks according to a particular contour, comprising:

a scoring machine including a separate drive therefor for scoring the contour on the glass blank;

a breaking machine for severing the scored contour from the glass blank;

a grinding machine including a table for supporting the glass blank, two grinding heads on opposite sides of said table, and a motor for driving each of said grinding heads, for smoothing the edges of the severed blank;

a conveyor for conveying the glass blank to each of the above machines for performing their respective scoring, severing and grinding operations thereon;

and a control system for controlling said scoring machine including its separate drive according to a digital scoring file, for controlling said breaking machine according to a digital breaking file, and for controlling said grinding machine including said grinding head motors according to a digital grinding file;

said grinding machine further comprising: a grinding head; and a table for supporting the glass blank after conveyed thereto by the conveyor; said grinding machine drive including a motor for rotating said table around a first axis, and another motor for moving said grinding head along a second axis perpendicular to said first axis towards and away from the glass blank on the table; said control system including programmed control means for controlling said latter motor to cause it to smoothen the outer edges of the glass blank on said table.

12. The apparatus according to claim 11, wherein said grinding machine comprises two grinding heads disposed along said second axis on opposite sides of the glass blank on the table, said grinding machine drive comprising a motor for each of said grinding heads; said programmed control means simultaneously controlling both of said latter motors.

13. The apparatus according to claim 7, wherein said conveyor includes an overhead crane having a pair of rails extending over said scoring, breaking and grinding machines; a slide movable along the length of said rails; a bridge movable transversely of said rails; and a plurality of suction cups carried by said bridge for gripping and conveying the glass blanks from one of said machines to the next.

* * * * *